US011836552B2

(12) United States Patent
Rose et al.

(10) Patent No.: US 11,836,552 B2
(45) Date of Patent: Dec. 5, 2023

(54) IMPLEMENTING A TYPE RESTRICTION THAT RESTRICTS TO A MAXIMUM OR SPECIFIC ELEMENT COUNT

(71) Applicant: Oracle International Corporation, Redwood Shores, CA (US)

(72) Inventors: John Robert Rose, San Jose, CA (US); Brian Goetz, Williston, VT (US)

(73) Assignee: Oracle International Corporation, Redwood Shores, CA (US)

( * ) Notice: Subject to any disclaimer, the term of this patent is extended or adjusted under 35 U.S.C. 154(b) by 51 days.

(21) Appl. No.: 17/571,379

(22) Filed: Jan. 7, 2022

(65) Prior Publication Data

US 2022/0300476 A1 Sep. 22, 2022

Related U.S. Application Data

(60) Provisional application No. 63/163,697, filed on Mar. 19, 2021, provisional application No. 63/163,723, (Continued)

(51) Int. Cl.
*G06F 9/44* (2018.01)
*G06F 9/54* (2006.01)
(Continued)

(52) U.S. Cl.
CPC ............... *G06F 9/547* (2013.01); *G06F 8/41* (2013.01); *G06F 8/437* (2013.01);
(Continued)

(58) Field of Classification Search
None
See application file for complete search history.

(56) References Cited

U.S. PATENT DOCUMENTS 10,929,106 B1 2/2021 Sridhar
10,983,771 B1 4/2021 Hegarty et al.
(Continued)

FOREIGN PATENT DOCUMENTS

EP 1533696 A2 5/2005
EP 1588235 A2 10/2005
(Continued)

OTHER PUBLICATIONS

"Clojure.spec—Rationale and Overview," Retrieved at https://clojure.org/about/spec, Retrieved on Jan. 17, 2022, pp. 1-15.
(Continued)

*Primary Examiner* — Insun Kang
(74) *Attorney, Agent, or Firm* — Invoke

(57) ABSTRACT

A type restriction contextually modifies an existing type descriptor. The type restriction is imposed on a data structure to restrict the values that are assumable by the data structure. The type restriction does not cancel or otherwise override the effect of the existing type descriptor on the data structure. Rather the type restriction may declare that a value of the data structure's type is forbidden for the data structure. Additionally or alternatively, the type restriction may declare that an element count allowable for a data structure's type is forbidden for the data structure. Type restriction allows optionality (where only a singleton value for a data structure is allowed), empty sets (where no value for a data structure is allowed), and multiplicity (where only a limited element count for a data structure) to be injected into a code set independent of data type. Type restriction allows certain optimizations to be performed.

30 Claims, 17 Drawing Sheets

Related U.S. Application Data filed on Mar. 19, 2021, provisional application No. 63/163,701, filed on Mar. 19, 2021, provisional application No. 63/163,726, filed on Mar. 19, 2021.

(51) Int. Cl.

| | |
|---|---|
| *G06F 8/41* | (2018.01) |
| *G06F 16/28* | (2019.01) |
| *G06F 16/22* | (2019.01) |
| *G06F 9/448* | (2018.01) |
| *G06F 9/445* | (2018.01) |
| *G06F 9/30* | (2018.01) |
| *G06F 9/451* | (2018.01) |
| *G06F 12/02* | (2006.01) |
| *G06F 9/455* | (2018.01) |

(52) U.S. Cl.
CPC ........ *G06F 9/30076* (2013.01); *G06F 9/4488* (2018.02); *G06F 9/4494* (2018.02); *G06F 9/4498* (2018.02); *G06F 9/44521* (2013.01); *G06F 9/44536* (2013.01); *G06F 9/451* (2018.02); *G06F 9/45516* (2013.01); *G06F 9/541* (2013.01); *G06F 9/542* (2013.01); *G06F 9/548* (2013.01); *G06F 12/023* (2013.01); *G06F 16/2272* (2019.01); *G06F 16/2291* (2019.01); *G06F 16/289* (2019.01)

(56) References Cited

U.S. PATENT DOCUMENTS

| | | | |
|---|---|---|---|
| 2001/0013065 A1 | 8/2001 | Patki et al. | |
| 2006/0080644 A1 | 4/2006 | Fuhrer et al. | |
| 2006/0101032 A1 | 5/2006 | Sutter et al. | |
| 2007/0006141 A1 | 1/2007 | Bracha et al. | |
| 2007/0156845 A1 | 7/2007 | Devanneaux et al. | |
| 2007/0245325 A1 | 10/2007 | Lapounov et al. | |
| 2009/0182760 A1 | 7/2009 | Box et al. | |
| 2010/0114843 A1 | 5/2010 | Farrar et al. | |
| 2010/0146013 A1 | 6/2010 | Mather | |
| 2011/0283263 A1 | 11/2011 | Gagliardi et al. | |
| 2012/0166953 A1 | 6/2012 | Affronti et al. | |
| 2013/0067155 A1* | 3/2013 | Bates ........................ | G06F 8/00 711/E12.098 |
| 2013/0080736 A1 | 3/2013 | Meirowitz et al. | |
| 2015/0277899 A1 | 10/2015 | Hamby et al. | |
| 2015/0301840 A1 | 10/2015 | Goetz et al. | |
| 2016/0094625 A1 | 3/2016 | Sengodan et al. | |
| 2016/0162924 A1 | 6/2016 | Rathod | |
| 2016/0357586 A1 | 12/2016 | Rose | |
| 2017/0039043 A1 | 2/2017 | Haupt et al. | |
| 2017/0116007 A1 | 4/2017 | Cimadamore et al. | |
| 2017/0123771 A1* | 5/2017 | Smith ...................... | G06F 8/437 |
| 2018/0018151 A1* | 1/2018 | Goetz ...................... | G06F 8/447 |
| 2018/0150495 A1 | 5/2018 | Hoff et al. | |
| 2018/0268158 A1 | 9/2018 | Bateman et al. | |
| 2018/0285361 A1 | 10/2018 | Buckley et al. | |
| 2018/0293058 A1 | 10/2018 | Bierman et al. | |
| 2019/0073227 A1 | 3/2019 | Zhong | |
| 2020/0019423 A1 | 1/2020 | Marks et al. | |
| 2020/0026530 A1* | 1/2020 | Rose ................... | G06F 9/44526 |
| 2021/0240619 A1* | 8/2021 | Earnshaw ............. | G06F 9/3842 |
| 2022/0067105 A1 | 3/2022 | Vodovotz et al. | |

FOREIGN PATENT DOCUMENTS

| | | |
|---|---|---|
| EP | 1640859 A2 | 3/2006 |
| WO | 2004/068292 A2 | 8/2004 |
| WO | 2015/164438 A1 | 10/2015 |

OTHER PUBLICATIONS

"Common Descriptor Concepts," Retrieved at https://www.eclipse.org/eclipselink/documentation/2.6/concepts/descriptors001.htm, Retrieved on Oct. 31, 2017, pp. 1-6.

"JEP 218: Generics over Primitive Types" Retrieved at https://openjdk.java.net/jeps/218, Retrieved on 2022, pp. 1-4.

"Project Valhalla" Retrieved at https://openjdk.java.net/projects/valhalla/, Retrieved on Dec. 2021, pp. 1-3.

"Statically typed Javascript : Why and How," Retrieved at https://developerhowto.com/2019/01/05/statically-typed-javascript-why-and-how/, Retrieved on Jan. 2019, pp. 1-6.

"Template Classes in the VM" Retrieved at http://cr.openjdk.java.net/~jrose/values/template-classes.html, Retrieved on Nov. 2017, pp. 1-15.

Buckle N., "Restricted data types, specification and enforcement of invariant properties of variables," ACM SIGPLAN Notices, vol. 12, Issue 3, Mar. 1977, pp. 68-76.

Cimadamore I, M., "Constructs and Applications of Generic Programming in Object-Oriented Languages," University of Bologna, 2010, pp. 208.

Kennedy A., et al., "Design and Implementation of Generics for the .NET Common Language Runtime," ACM SIGPLAN Notices, vol. 36, Issue 5, May 2001, pp. 1-12.

Malabarba S, et al., "Runtime Support for Type-Safe Dynamic Java Classes," Lecture Notes in Computer Science, vol. 1850, 2000, pp. 337-361.

Rose J., "Template Class Challenges" Retrieved at http://cr.openjdk.java.net/~jrose/values/Templates-2019-0325.pdf, Retrieved on Mar. 2019, pp. 1-16.

Rose J., "The Saga of the Parametric VM," Retrieved at http://rosehome.org/work/pvm20211216/parametric-vm.pdf, Retrieved on Jan. 2021, pp. 1-33.

Wikipedia., "Entity-relationship model," Retrieved at https://en.wikipedia.org/wiki/Entity%E2%80%93relationship_model, Retrieved on Dec. 2021, pp. 1-12.

* cited by examiner

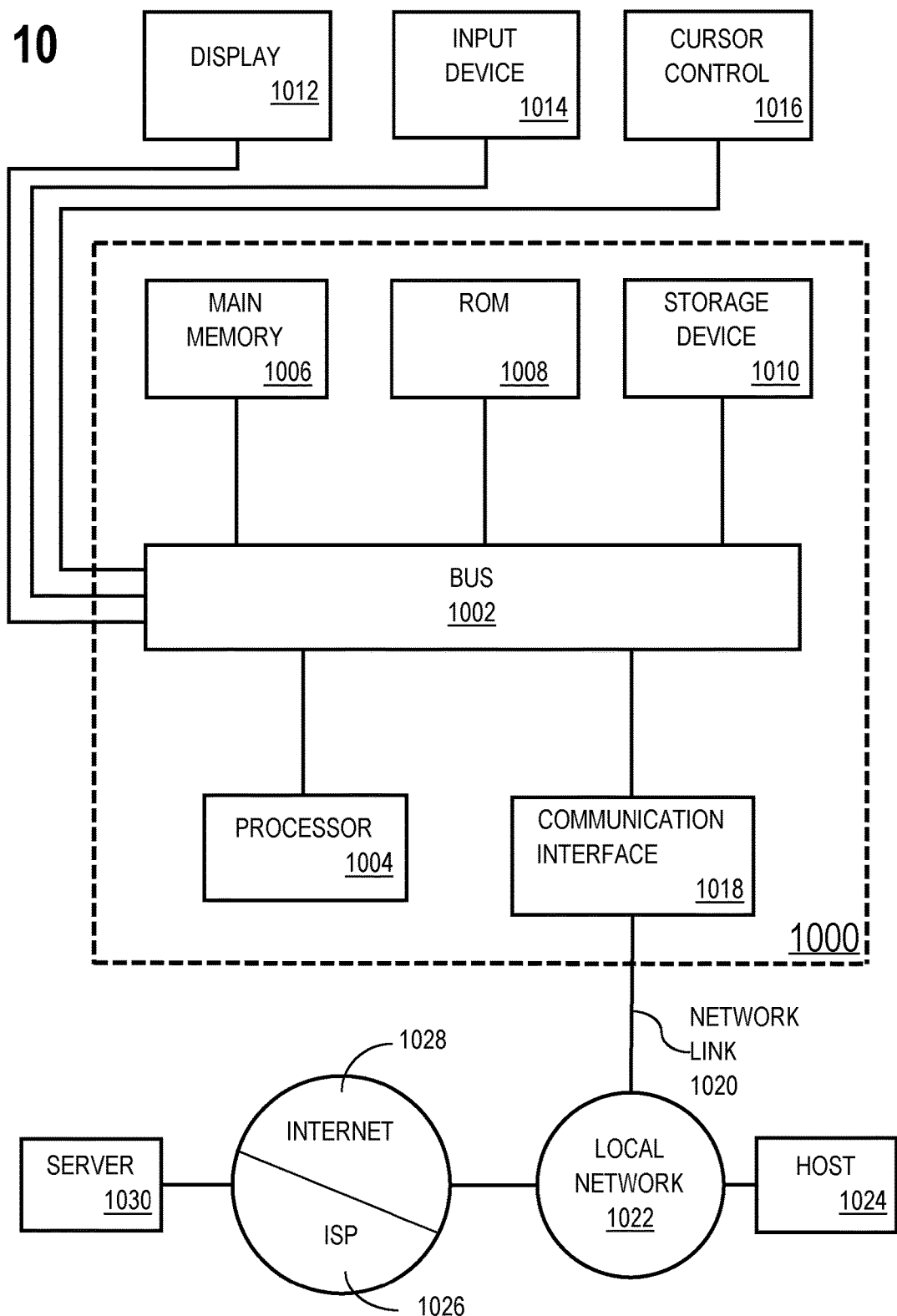

IMPLEMENTING A TYPE RESTRICTION THAT RESTRICTS TO A MAXIMUM OR SPECIFIC ELEMENT COUNT

RELATED APPLICATIONS; INCORPORATION BY REFERENCE

This application hereby incorporates by reference the following applications: Application No. 63/163,697, filed on Mar. 19, 2021, titled "Dynamically Imposed Field and Method Type Restrictions For Managed Execution Environments"; Application No. 63/163,701, filed on Mar. 19, 2021, titled "Optional Specialization of Generic Types and Methods"; Application No. 63/163,723, filed on Mar. 19, 2021, titled "Encapsulated Specialization of Dynamically-Linked API Points"; Application No. 63/163,726, filed on Mar. 19, 2021, titled "Pointwise and Replicative Type Specializations"; Application Ser. No. 17/571,323, filed on Jan. 7, 2022 titled "Dynamically-Imposed Field and Method Type Restrictions for Managed Execution Environments"; application Ser. No. 17/571,328, filed on Jan. 7, 2022 titled "Implementing Optional Specialization When Executing Code"; application No. 17/571,329, filed on Jan. 7, 2022 titled "Implementing Optional Specialization When Compiling Code"; application Ser. No. 17/571,335, filed on Jan. 7, 2022 titled "Determining different resolution states for a parametric constant in different contexts"; application Ser. No. 17/571,340, filed on Jan. 7, 2022 titled "Determining a resolution state of an anchor constant associated with an application programming interface (API) point"; application Ser. No. 17/571,343, filed on Jan. 7, 2022 titled "Executing a parametric method within a specialized context"; application Ser. No. 17/571,349, filed on Jan. 7, 2022 titled "Instantiating a parametric class within a specialized context"; application Ser. No. 17/571,353, filed on Jan. 7, 2022 titled "Accessing a parametric field within a specialized context"; application Ser. No. 17/571,356, filed on Jan. 7, 2022 titled "Implementing a type restriction that restricts to a non-polymorphic layout type or a maximum value" and application Ser. No. 17/571,359, filed on Jan. 7, 2022 titled "Implementing a type restriction that restricts to a singleton value or zero values, each of which is hereby incorporated by reference.

TECHNICAL FIELD

The present disclosure relates to managed runtime environments. In particular, the present disclosure relates to pointwise and replicative type specializations.

BACKGROUND

Managed execution environments, such as the Java Virtual Machine (JVM) and Common Language Runtime (CLR), have a type system which symbolically encodes types of fields and methods. Such a symbolic encoding is sometimes called a type descriptor or type signature. If a type cannot be symbolically encoded as a descriptor, it cannot be imposed on a field or method.

Exotic types not already described by an existing type descriptor (e.g., null-free references, flattened objects, range-limited numerics, fixed-size arrays) cannot be added to such a system without extending the descriptor grammar. Optional values (e.g., an optional field, argument, and/or return value), and multiple values (e.g., tuples) cannot be added to such a system without extending the descriptor grammar. Such an extension is difficult because it affects the entire managed environment. For example, when CLR added generics, they added new syntaxes to descriptors, requiring a re-work of all parts of the managed environment, and making support of the newly declared types required at all points of the system.

Beside the difficulty of changing the descriptor grammar, such changes are also hard to evolve. If a second wave of types is added, and a third wave is found to be required later, both waves must be supported forever.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 illustrates a system in accordance with one or more embodiments.

DETAILED DESCRIPTION

Figure 1:
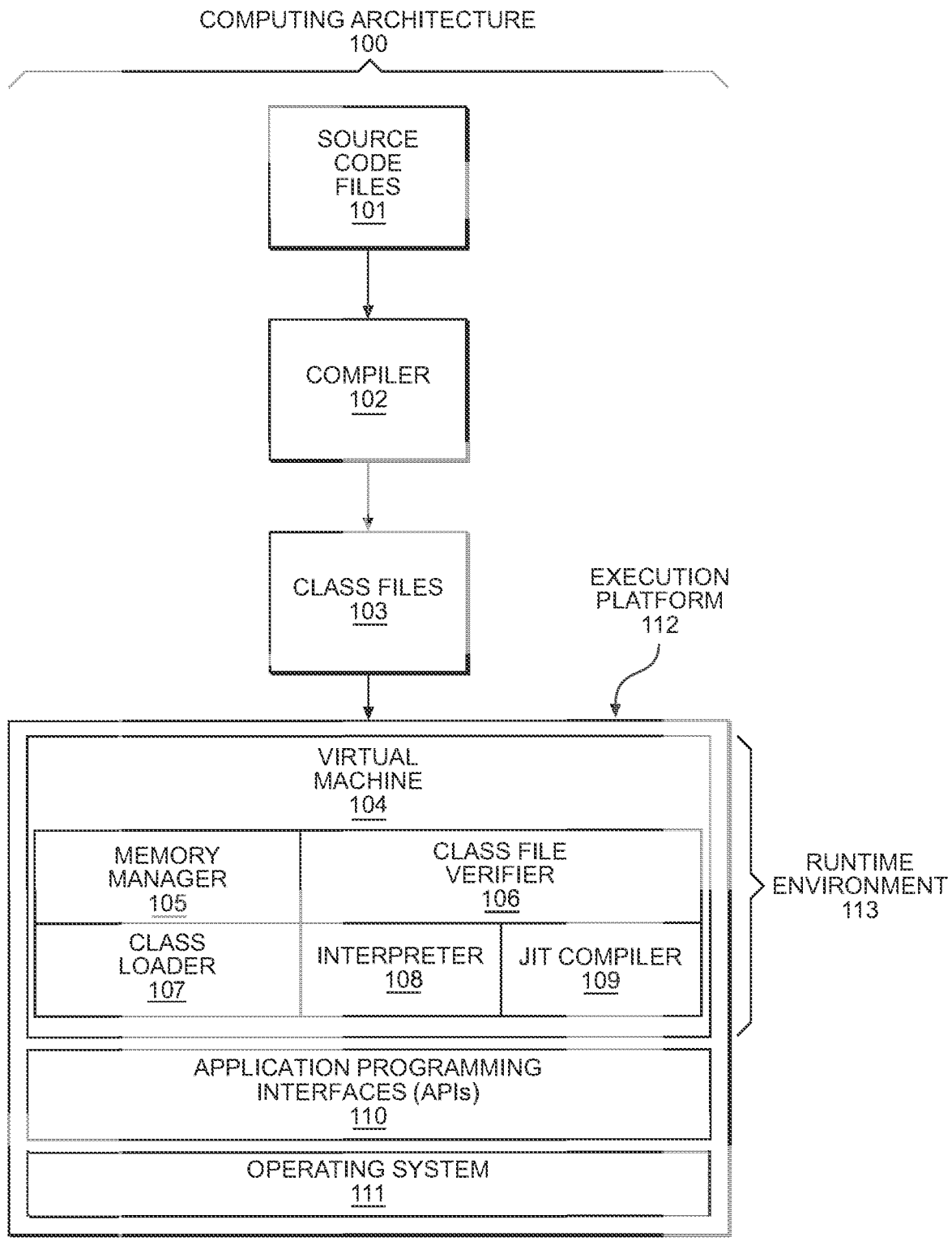
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
    2.1 EXAMPLE CLASS FILE STRUCTURE
    2.2 EXAMPLE VIRTUAL MACHINE ARCHITECTURE
    2.3 LOADING, LINKING, AND INITIALIZING
3. TYPE RESTRICTIONS
4. OPTIMIZING BASED ON TYPE RESTRICTIONS
5. MISCELLANEOUS; EXTENSIONS
6. HARDWARE OVERVIEW

1. General Overview

One or more embodiments include dynamically imposed field and method type restrictions for managed execution environments. The system may include a plurality of application programming interface (API) points (e.g., named classes, interfaces, methods, constructors, or fields). The system may allow descriptors to be contextually modified by an additional attribute attached to an API point, called a type restriction. In some embodiments, the type restriction attribute may be isolated. Alternatively, the type restriction attribute may be presented in combination with other information, such as with the class file. The type restriction does not cancel or replace the effect of the existing type descriptor on the field or method; rather the type restriction includes information which (a) forbids a value of the API point that would otherwise be permitted based on the type descriptor (the type expressed in the descriptor syntax), and/or (b) forbids a value of a cardinality of the API point that would otherwise be permitted based on the type descriptor. In the case of a method, restrictions may be placed on any or all of the method's parameters and/or the return type.

Imposing the type restriction (e.g., a dynamically variable type system) in addition to the type descriptor (e.g., a fixed type system) preserves the benefits of the existing type descriptor system while adding additional benefits of the type restriction, such as improving type representation to increase efficiency of the managed execution environment.

In particular, type restriction allows optionality (where only a singleton value for the API point is allowed) to be injected into a set of code independent of the data type. Additionally or alternatively, type restriction allows empty sets (where no value for the API point is allowed) to be injected into a set of code independent of the data type. Additionally or alternatively, type restriction allows multiplicity (where only a limited element count for the API point is allowed) to be injected into a set of code independent of the data type.

One or more embodiments include accessing or creating a data structure restricted by a non-polymorphic type restriction. The term "data structure" may refer to, for example, an object, a field, a method parameter, a method return value, a variable, a constant, and/or an API point. Where the data structure is an object, creating the data structure involves allocating memory space to the object. Where the data structure is a field, creating the data structure involves allocating memory space to the field in the process of creating the object that includes the field. Where the data structure is a method parameter, creating the data structure involves allocating memory space to the method parameter as a local variable of a stack frame and/or on an operand stack of a stack frame. Where the data structure is a method return value, creating the data structure involves allocating memory space to the method return value when returning from a callee method to a caller method.

A non-polymorphic type is an aggregate type with fixed memory layout. All instances of such a non-polymorphic type have the same memory layout. Examples of non-polymorphic types include primitive types, array types with fixed memory layout, and struct types of known components. Examples of primitive types include byte, short, int, long, float, double, char and Boolean. As an example, an aggregate type that is declared final is a non-polymorphic type.

A runtime environment identifies an instruction to access or create a data structure within a particular context. The particular context is associated with a type restriction on the data structure. Where the type restriction restricts the data structure to a non-polymorphic type, a flattened memory structure and a memory size may be determined for the data structure based on the non-polymorphic type. The runtime environment may access the data structure directly, without the need for indirect references. If the access to the data structure involves writing a data value to the data structure, a check is performed prior to writing to verify that the data value to be written conforms to the non-polymorphic type.

One or more embodiments include accessing or creating a data structure restricted by a maximum-value type restriction. A runtime environment identifies an instruction to access or create a data structure within a particular context. The particular context is associated with a type restriction on the data structure. Where the type restriction restricts the data structure to a maximum value, a flattened memory structure and a memory size may be determined for the data structure based on the maximum value. The runtime environment may access the data structure directly, without the need for indirect references. If the access to the data structure involves writing a data value to the data structure, a check is performed prior to writing to verify that the data value to be written is less than or equal to the maximum value.

One or more embodiments include accessing or creating a data structure restricted by a singleton value type restriction or a zero value type restriction. A runtime environment identifies an instruction to access or create a data structure within a particular context. The particular context is associated with a type restriction on the data structure. Where the type restriction restricts the data structure to a singleton value, the singleton value is used as a data value for the data structure, even though no memory space of the data structure stores the data value. If the access to the data structure involves writing a data value to the data structure, a check is performed prior to writing to verify that the data value to be written equals the singleton value. Where the type restriction restricts the data structure to no values, no memory space of the data structure stores any data value, and an attempt to access the data structure results in an error.

One or more embodiments include creating a data structure, of an aggregate type, that is restricted by an element count type restriction. A runtime environment identifies an instruction to create an aggregate data structure within a particular context. The particular context is associated with a type restriction on the aggregate data structure. The type restriction restricts the aggregate data structure to a maximum element count or a specific element count. Where the type restriction restricts to a specific element count, allocating memory space to the aggregate data structure involves: (a) having no portion of the allocated memory space store an element count of the aggregate data structure, and (b) determining a memory size of the allocated memory space based on a required memory size for storing the specific element count of elements. Where the type restriction restricts to a maximum element count, allocating memory space to the aggregate data structure involves determining a memory size of the allocated memory space based on a required memory size for storing the maximum element count of elements. However, a portion of the memory space allocated to the aggregate data structure may store an element count of the aggregate data structure.

One or more embodiments include accessing an element, corresponding to a particular index, of an aggregate data structure that is restricted by an element count type restriction. A runtime environment identifies an instruction to access an element, corresponding to a particular index, of an aggregate data structure within a particular context. The particular context is associated with a type restriction on the aggregate data structure. The type restriction restricts the aggregate data structure to a maximum element count or a specific element count. Prior to accessing the element, a check is performed to verify that the particular index is not out of bounds with respect to the aggregate data structure. Whether the particular index is out of bounds is determined based on the maximum element count or specific element count imposed by the type restriction. The verification may be performed without necessarily accessing the aggregate data structure itself and/or determining an actual element count of the aggregate data structure.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
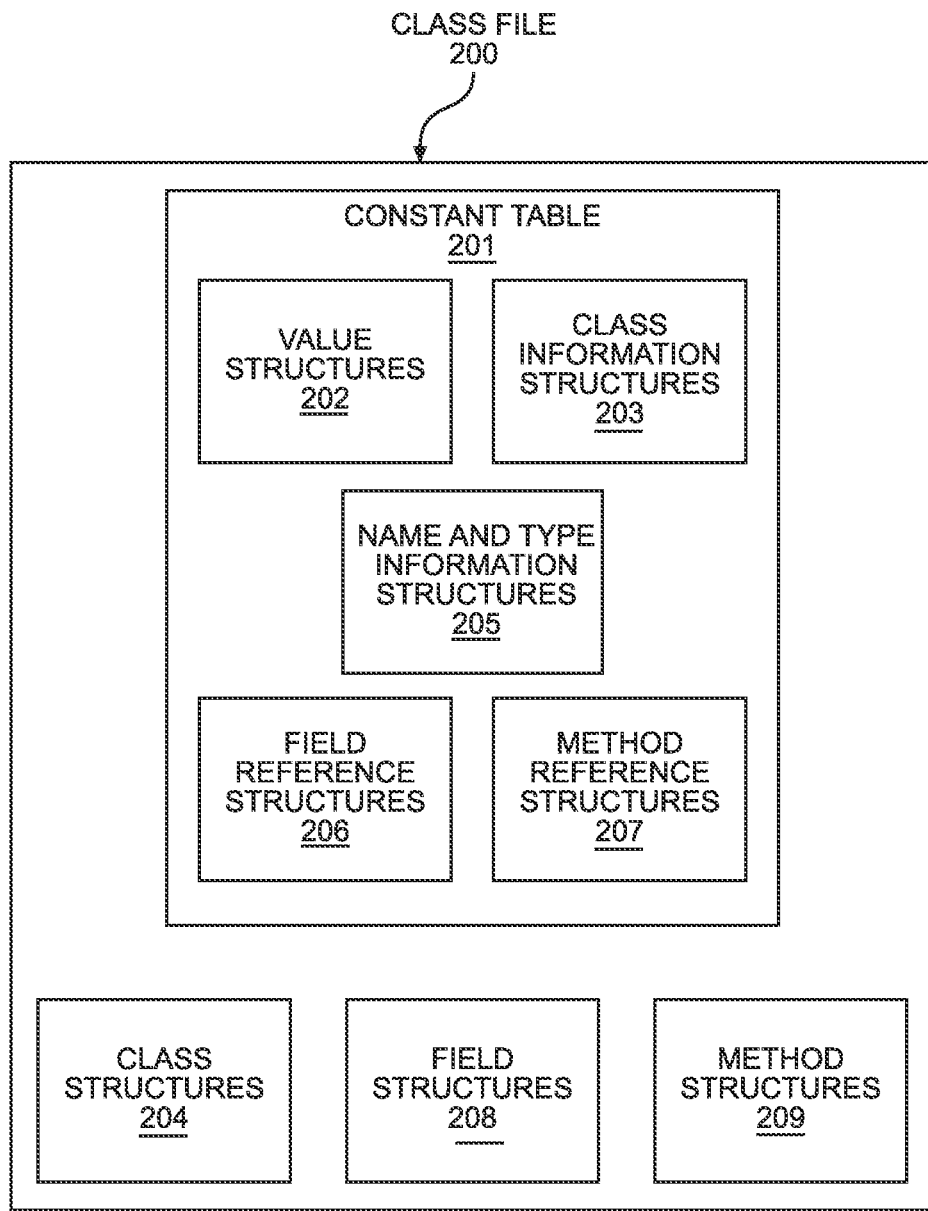
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 (also referred to as "class metadata") includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
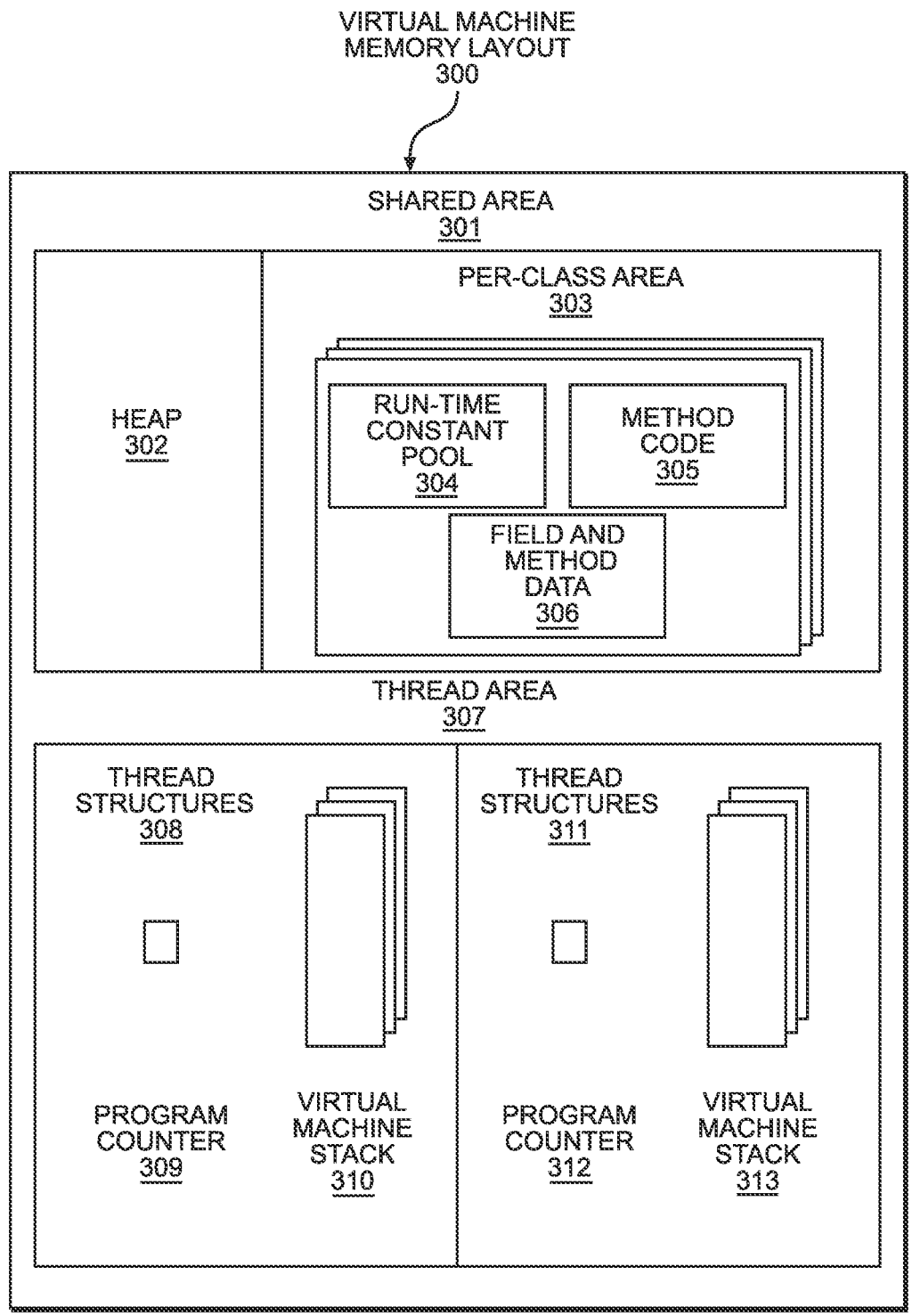
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
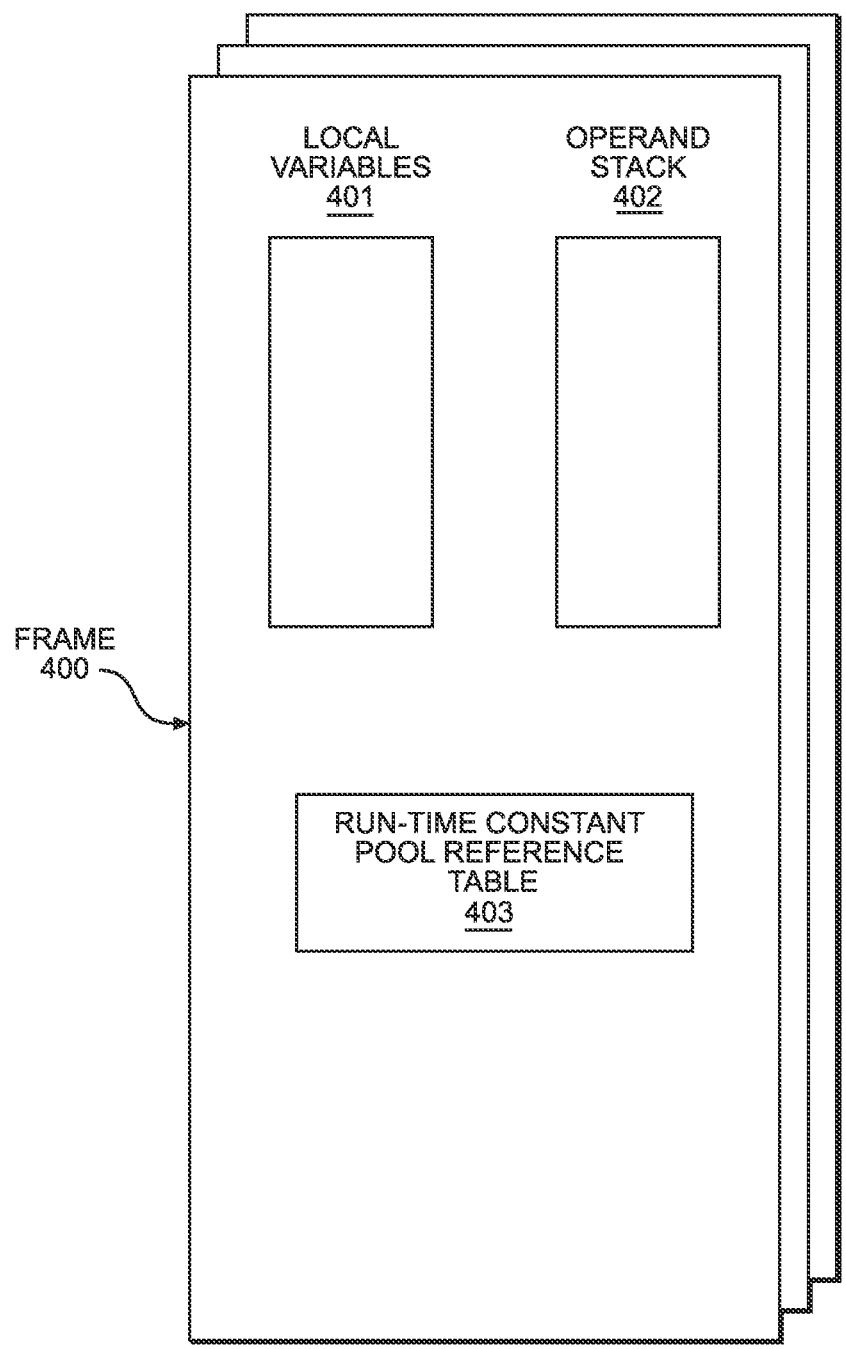
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, And Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Type Restrictions

In one or more embodiments, a data structure is associated with a type descriptor. The term "data structure" may refer to, for example, an object, a field, a method parameter, a method return value, a variable, a constant, and/or an API point. A data structure may be an "aggregate data structure," which is a data structure that holds zero, one, or more elements of a same base type. As an example, a type tourbus may define a field passenger_ages as being associated with a type int [ ], or "array of ints." The field passenger_ages may hold zero, one, or more elements indicating the ages of respective passengers on a tour bus. A type descriptor of passenger_ages may indicate that the type of passenger_ages is int [ ]. A base type of the elements of passenger_ages is therefore int.

In one or more embodiments, a type restriction may include information that contextually modifies an existing type descriptor.

In embodiments, a type restriction may be presented in combination with other information, such as a type specialization. A caller of an API point may specify a selector value that proposes a specialization of the API point. A definer of the API point may indicate that the API point is of a particular type. Based on the selector value, the definer of the API point determines an anchor value. The anchor value stores a set of specialization decisions with respect to the API point (and any co-parametric API points). The specialization decisions may include one or more type restrictions. The anchor value therefore specializes the type specified for the API point by the definer of the API point. Examples of using type restrictions used in combination with type specialization are described in [R00640Z1, R00640NP, R00640N2, R00640N3, R00640N4, R00640N5], each of which is incorporated by reference. Alternatively, a type restriction may be presented alone, separate from other information. The type restriction may be presented at any time prior to the system accessing an API point to which the type restriction is applied. For example, type restrictions can be presented at compile time, at link time, at class loading time, and/or at optimization time.

A type restriction is imposed on a data structure to restrict the values that are assumable by the data structure. For an aggregate data structure, a type restriction may restrict an element count that is assumable by the aggregate data structure. As an example, a type house may define a field chairs_per_room as being associated with a type int [ ], or "array of ints." The field chairs_per_room may hold zero, one, or more elements indicating a number of chairs per room within a house. A given house may have five (5) rooms, wherein each room must have an even number of chairs. A type restriction on the array type int [ ] may limit chairs_per_room to a specific element count of 5. A type restriction on the base type int may limit each element of chairs_per_room to even numbers only.

A type restriction does not cancel or otherwise override the effect of the existing type descriptor on the field or method. Rather the type restriction may declare that one or more values of the field or method's type (e.g., the type expressed in the descriptor syntax) are forbidden (e.g., restricted) for a particular field or method. Additionally or alternatively, the type restriction may declare that an element count allowable for a data structure's type is forbidden (e.g., restricted) for a particular data structure. For example, a type restriction may limit a data structure, method parameter, or return value to non-NULL values, impose a limit on a numerical range, and/or require arrays of a fixed size. There are many different type restrictions possible.

In the case of a field, a type restriction may be applied to the value of the field. In the case of a method, a type restriction may be applied to one or more of the parameters and/or the return type.

In embodiments, a type restriction may be determined dynamically. For example, a type restriction may refer to a dynamically resolved constant. The dynamically resolved constant may include a reference to an object which the managed runtime is free to interpret in any agreed manner.

Examples of operations for applying type restrictions are described in [R00638Z1, R00638NP], each of which is incorporated herein. In an embodiment, a type restriction requires a singleton value be assigned to a data structure. A system blocks any operation that attempts to write a value to the data structure other than the singleton value. In another embodiment, a type restriction restricts any value from being assigned to a data structure. A system blocks any operation that attempts to write a value to the data structure. In an embodiment, a type restriction limits an element count of an aggregate data structure (such as an array, tuple, list, B-tree node). A type restriction may provide that an aggregate data structure have a maximum element count or a specific element count. A system blocks any operation that attempts to create an aggregate data structure having an element count inconsistent with the element count limit. Violations to a type restriction may be blocked without any user code (source code or bytecode) that checks the criteria; rather violations to a type restriction are blocked based on a managed runtime's enforcement of the type restriction.

Figure 5:
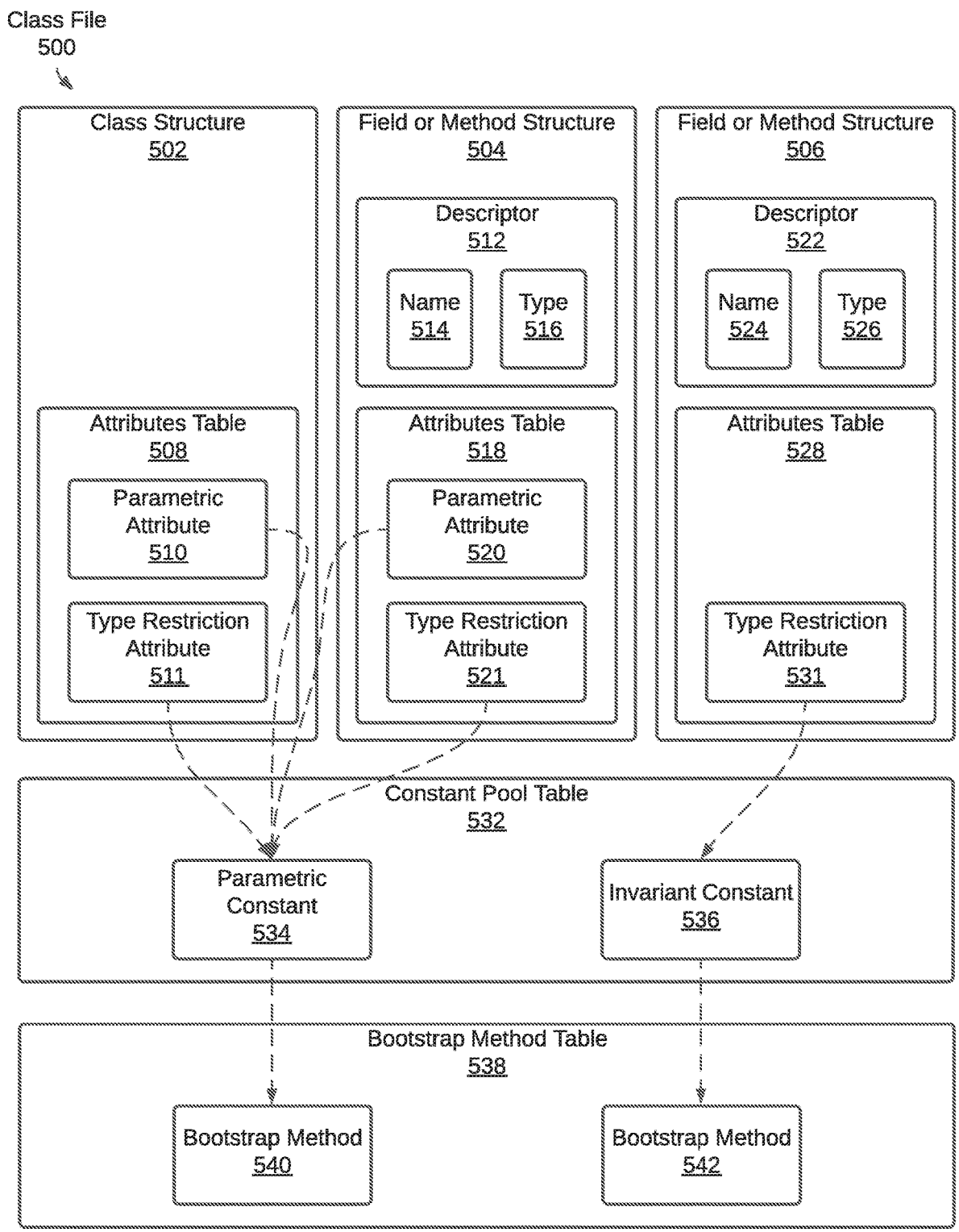
FIG. 5 illustrates a class file including type restrictions on one or more data structures according to an embodiment.

FIG. 5 illustrates a class file including type restrictions on one or more data structures according to an embodiment.

In one or more embodiments, a class file 500 for a type includes various information structures for different components of the type, including a class structure 502, one or more field structures or method structures 504-506. Further, a class file 500 includes a constant pool table 532 and a bootstrap method table 538. A class file 500 is similar to a class file 200 of FIG. 2. A class structure 502 is similar to a class structure 204 of FIG. 2. A field structure or method structure 504-506 is similar to a field structure 208 or method structure 209, respectively, of FIG. 2. A constant pool table 532 is similar to a constant table 201 of FIG. 2.

In one or more embodiments, a constant pool table 532 of a type includes a set of entries corresponding to respective constants (such as parametric constant 534 and invariant constant 536) defined by the type. Each entry is an information structure for a corresponding constant. An information structure for a constant includes a tag and an information array. The tag indicates a kind of the corresponding constant. The information array includes information about the corresponding constant. The information array may include, for example, a reference to a bootstrap method for the corresponding constant.

In one or more embodiments, an invariant constant 536 is associated with a single resolution state. Once a resolved value is determined for the resolution state, the resolved value is permanent for the resolution state.

In one or more embodiments, a parametric constant 534 is associated with different resolution states within different contexts, wherein a respective resolved value for each resolution state is permanent.

Details regarding parametric constants, as well as specialization anchor constants and parametric attributes, are provided in [R00640Z1, R00640NP, R00640N2, R00640N3, R00640N4, R00640N5], each of which is incorporated by reference.

In one or more embodiments, a bootstrap method (such as any of bootstrap methods 540-542) for a constant is a method configured to bring a constant from an unresolved state to a resolution state. A bootstrap method is configured to determine a resolved value (or an error) for a resolution state of a constant. As illustrated, for example, bootstrap method 540 corresponds to parametric constant 534; bootstrap method 542 corresponds to invariant constant 536.

In one or more embodiments, an information structure for an application programming interface (API) point is associated with a descriptor. The term "API point" as used herein refers to an interface, a class, a field, a method, and/or a constructor. As illustrated, a field or method structure 504 for a field or method in the type is associated with a descriptor 512; a field or method structure 506 for a field or method in the type is associated with a descriptor 522.

A descriptor for an API point indicates a name and type of the API point. As illustrated, descriptor 512 indicates name 514 and type 516 for field or method structure 504; descriptor 522 indicates name 524 and type 526 for field or method structure 506. A descriptor for a field indicates a name of the field and a type of the field. A type of a field may also be referred to specifically as a "field type." A descriptor for a method indicates a name of the method, and one or more types of a method return value, and zero or more method parameters.

In one or more embodiments, an information structure for an API point is associated with an attributes table. As illustrated, a class structure 502 for a type is associated with an attributes table 508; a field or method structure 504 for a field or method in the type is associated with an attributes table 518; a field or method structure 506 for a field or method in the type is associated with an attributes table 528. An attributes table (such as any of attributes tables 508, 518, 528) includes zero or more attributes associated with the corresponding API point.

In one or more embodiments, a parametric attribute (such as any of parametric attributes 510, 520) is a kind of attribute that marks an API point as parametric and therefore specializable with respect to a particular context. If a parametric attribute is present in an information structure for an API point, then the API point is parametric. If no parametric attribute is present in an information structure for an API point, then the API point is invariant.

A parametric attribute includes an attribute name index, an attribute length, and a parametric constant reference. The attribute name index indicates an identifier for the parametric attribute (such as the string, "Parametric"). The attribute length indicates a length of the subsequent information in the parametric attribute. The parametric constant reference points to a constant (for example, the parametric constant reference is an index into the constant pool table 532) that is parametric. (The referenced parametric constant may be a specialization anchor constant, which resolves to an anchor value, which embodies a set of specialization decisions within a particular context.) Based on the reference from a parametric attribute, a dependency from the API point on the parametric constant is established. As illustrated, a parametric attribute 510 associated with a class structure 502 for a type references a parametric constant 534 within a constant pool table 532, thereby indicating that the type depends on the parametric constant 534. A parametric attribute 520 associated with a field or method structure 504 for a field or method in the type references the parametric constant 534 within the constant pool table 532, thereby indicating that the field or method depends on the parametric constant 534. Not illustrated, different field or method structures may depend on different parametric constants.

In one or more embodiments, a type restriction attribute (such as any of type restriction attributes 511, 521, 531) is a kind of attribute that marks an API point as being associated with a type restriction. A type restriction attribute associated with a field structure indicates that a type restriction may be imposed on the field. A type restriction attribute associated with a method structure indicates that a type restriction may be imposed on one or more of the method parameters and/or the method return value. If no type restriction attribute is present in an information structure for an API point, then the API point is not associated with any type restriction.

A type restriction attribute includes an attribute name index, an attribute length, a restrictions count, and a restrictions array. The attribute name index indicates an identifier for the type restriction attribute (such as the string, "TypeRestriction"). The attribute length indicates a length of the subsequent information in the type restriction attribute. The restrictions count indicates a number of entries in the restrictions array. The value of each element in the restrictions array is either zero (0) or else points to a constant (for example, the restrictions array element is an index into the constant pool table 532). If the type restriction attribute is associated with a field F, then the restrictions array includes a single element, which corresponds to a field type. If the type restriction attribute is associated with a method M, then the restrictions array includes a first element corresponding to the method return type, and subsequently one element corresponding to each method parameter type. The referenced constant (if not zero) is a loadable constant K, which when resolved supplies type restriction information for a field value, method return value, or method parameter value for the field F or method M associated with the type restriction attribute. This constant K may be co-parametric with F or M.

In an embodiment, any element in a restrictions array may refer to an invariant constant. Invariant type restrictions are applied to all accesses. If the field or method associated with a restrictions array is parametric, any element in the restrictions array may also be co-parametric with that field or method. Parametric type restrictions are applied to parametric accesses and also to specialized instance fields or specialized virtual methods. Meanwhile, a type restriction applied to a data structure does not affect accesses to other data structures.

As an example, a first field structure for a first field may include a descriptor indicating that the first field is of a particular type (for example, int). A second field structure for a second field may include a descriptor indicating that the second field is of the same particular type (that is, int). Therefore, the first and second fields are of the same type. However, a type restriction attribute may be associated with the first field, while no type restriction attribute is associated with the second field.

The type restriction attribute of the first field may indicate a parametric type restriction. In a particular context, the parametric type restriction constant may be resolved to a value indicating that the first field is limited to values of even integers. In other contexts, the parametric type restriction constant may be resolved to a value indicating no limitation is applied to the first field.

Therefore, when accessing the first field within the particular context, the type restriction requiring even integers applies to the first field. When accessing the field within other contexts, no type restriction applies. When accessing the second field within any context, no type restriction applies.

In one or more embodiments, particular type restrictions may be used. A singleton value type restriction restricts a data structure from assuming any value other than a singleton value. A zero value type restriction restricts a data structure from assuming any value at all. An element count type restriction limits an aggregate data structure to a maximum element count or a specific element count. Certain optimizations may be performed by a compiler and/or runtime environment based on the particular type restrictions. Examples of such optimizations are described below with reference to FIGS. 8A-12.

Figure 6A:
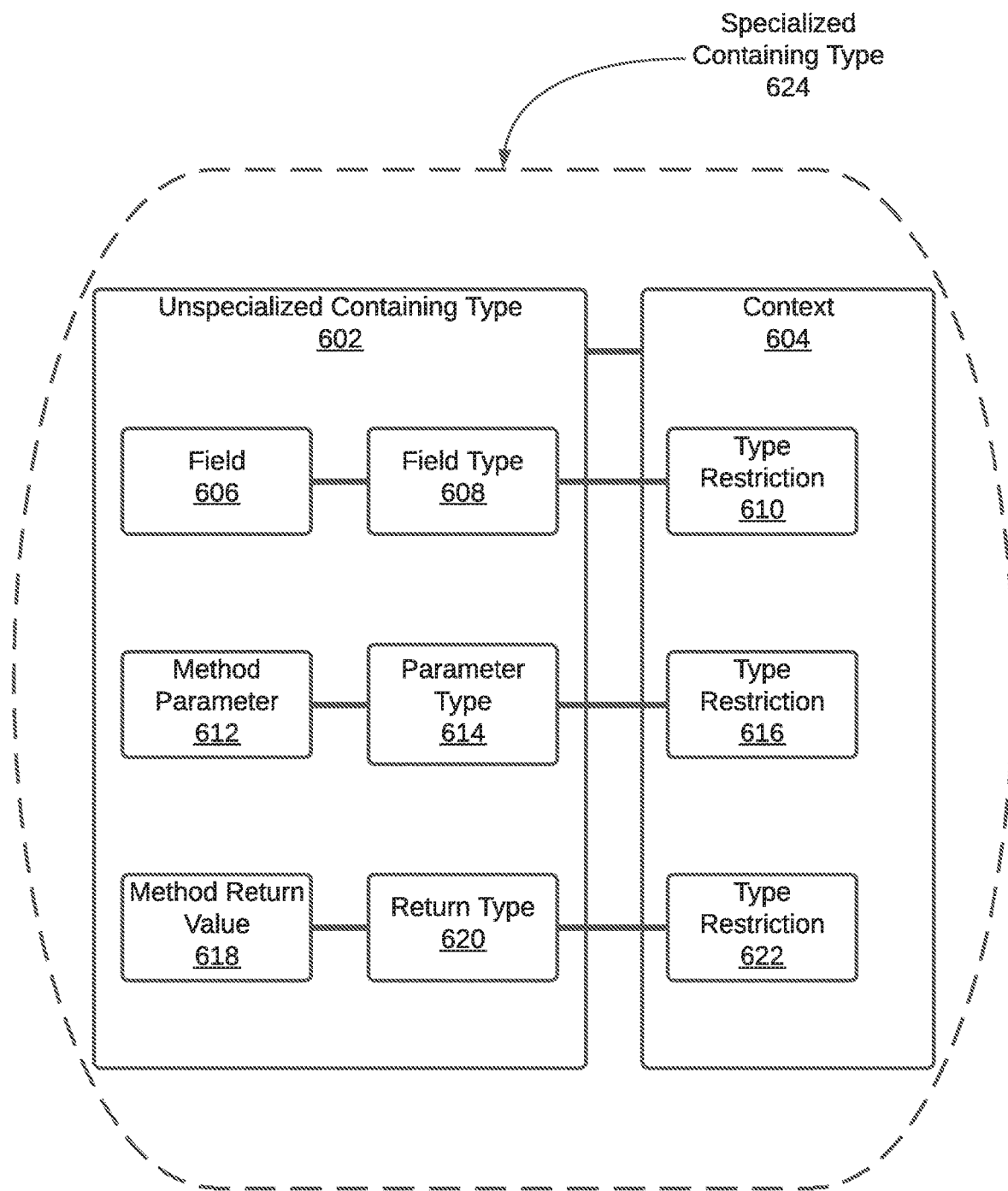
FIG. 6A illustrates an unspecialized type and a specialized type that is the unspecialized type specialized within a particular context according to an embodiment.

FIG. 6A illustrates an unspecialized type and a specialized type that is the unspecialized type specialized within a particular context according to an embodiment.

In one or more embodiments, an unspecialized type (such as an unspecialized containing type 602) is associated with a class structure (such as class structure 204 of FIG. 2). A class structure for an unspecialized type includes one or more of:

a definition of a constant pool table corresponding to the unspecialized type;
an identification of a superclass (a default value, such as zero, may indicate a default class, such as Object);
identification(s) of one or more superinterfaces;
a fields table;
a methods table; and/or
an attributes table.

In an embodiment, each entry in a fields table is a field structure (such as field structure 208 of FIG. 2). A field structure provides a complete description of a field (such as field 606) in the unspecialized type. A fields table includes fields declared by the unspecialized type; a fields table does not necessarily include fields that are inherited from superclasses or superinterfaces.

In an embodiment, a field structure for a field 606 indicates a descriptor for the field 606. The descriptor indicates a name and field type 608 of the field 606.

In an embodiment, a field 606 is declared, in source code, as being parametrized over a type parameter T. During compilation into virtual machine instructions, the type parameter T is erased to become an upper bound type associated with the type parameter T. The upper bound type of the type parameter T is either specified in the source code, or assumed to be Object. The upper bound type of the type parameter T is used as the field type 608 of the field 606. Therefore, the descriptor of the field 606 indicates the upper bound type of the type parameter T as the field type 608 of the field 606.

In an embodiment, each entry in a methods table is a method structure (such as method structure 209 of FIG. 2). A method structure provides a complete description of a method in the unspecialized type. A methods table includes methods declared by the unspecialized type; a methods table does not necessarily include methods that are inherited from superclasses or superinterfaces.

In an embodiment, a method structure for a method indicates a descriptor for the method. The descriptor indicates a name of the method, parameter types 614 of method parameters 612 (if any), and a return type 620 of a method return value 618.

In an embodiment, a method parameter 612 and/or method return value 618 of a method is declared, in source code, as being parametrized over a type parameter T. During compilation into virtual machine instructions, the type parameter T is erased to become an upper bound type associated with the type parameter T. The upper bound type of the type parameter T is either specified in the source code, or assumed to be Object. The upper bound type of the type parameter T is used as a method parameter type 614 and/or method return value type 620 associated with the method. Therefore, the descriptor of the method indicates the upper bound type of the type parameter T as the method parameter type 614 and/or method return value type 620.

In one or more embodiments, a specialized type (such as a specialized containing type 614) is an unspecialized type specialized within a particular context 604.

As illustrated, for example, an unspecialized containing type 602 defines a field 606 and specifies that the field 606 is of a field type 608. In particular, the unspecialized containing type 602 provides a descriptor corresponding to the field 606 that indicates the field type 608 for the field 606. The unspecialized containing type 602 may further define a method associated with a method parameter type 614 and a method return value type 620. In particular, the unspecialized containing type 602 provides a descriptor corresponding to the method that indicates the method parameter type 614 and the method return value type 620 for the method.

A caller may call the unspecialized containing type 602, the field 608 in the unspecialized containing type 602, and/or the method in the unspecialized containing type 602. The caller may make the call within a particular context 604. The caller may specify the context 604 by, for example, specifying an anchor value.

The unspecialized containing type 602 specialized within the particular context 604 is a specialized containing type 614. The specialized containing type 614 may be the unspecialized containing type 602 called in conjunction with the anchor value. An object (or class mirror) represents the unspecialized containing type 602; a different object (or class mirror) represents the specialized containing type 614.

Within the particular context 604, the field type 608 is adorned with one or more type restrictions 610. The type restrictions 610 may be indicated by the anchor value. A type restriction 610 prohibits the field 606 from assuming one or more values that are valid for the field type 608.

Within the particular context 604, the method parameter type 614 and/or method return value type 620 is adorned with one or more type restrictions 616, 622. The type restrictions 616, 622 may be indicated by the anchor value. A type restriction 616 prohibits the method parameter 612 from assuming one or more values that are valid for the method parameter type 614. A type restriction 622 prohibits the method return value 618 from assuming one or more values that are valid for the method return value type 620. A particular context 604 may provide same or different type restrictions to fields, method parameters, and/or method return values in a same specialized containing type 624.

Therefore, an unspecialized containing type 602 "indicates" a field type 608 of a field 606, a parameter type 614 of a method parameter 612, and/or a return type 620 of a method return value 618. Additionally or alternatively, a descriptor corresponding to a field 606 "indicates" a field type 608 of the field 606 and a descriptor corresponding to a method "indicates" a parameter type 614 and/or a return type 620; a context 604 (which may be provided by an anchor value), together with a descriptor, "indicates" a field type 608 of a field 606 adorned with a type restriction 610, a parameter type 614 of a method parameter 612 adorned with a type restriction 616, and/or a return type 620 of a method return value 618 adorned with a type restriction 622.

Figure 6B:
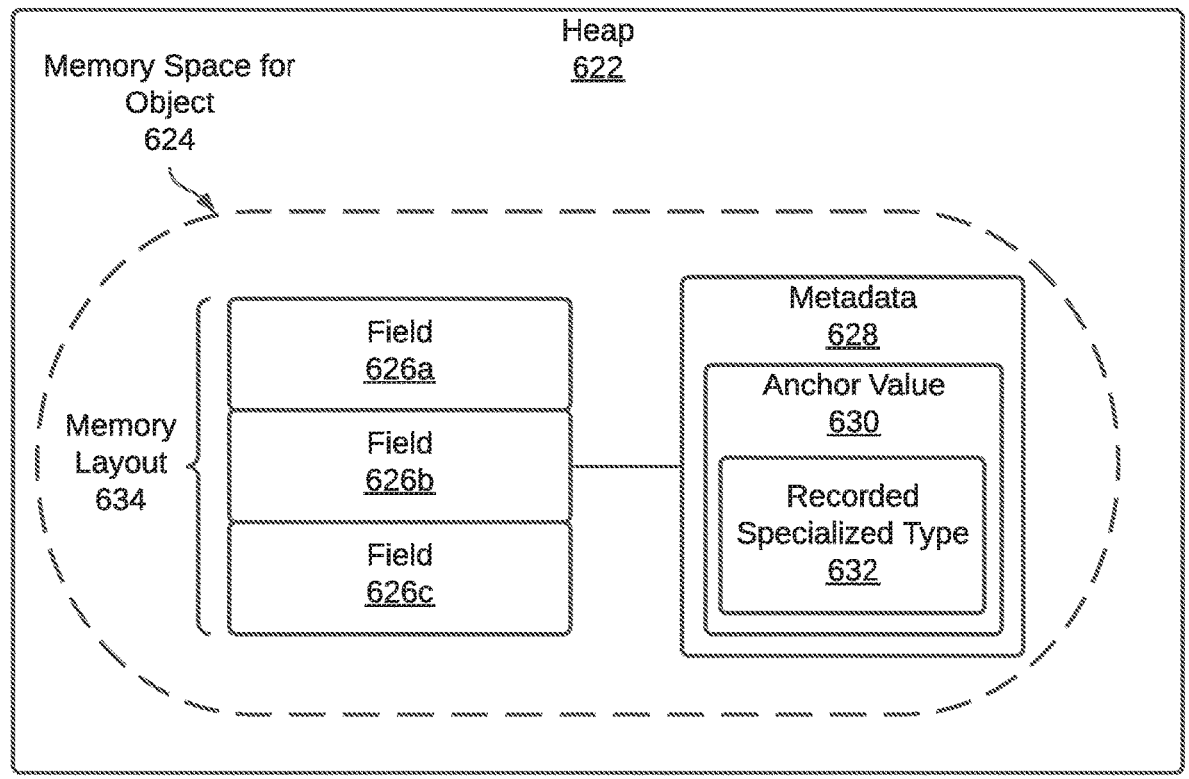
FIG. 6B illustrates an object of a specialized type according to an embodiment.

FIG. 6B illustrates an object of a specialized type according to an embodiment.

In one or more embodiments, a type (unspecialized or specialized) is associated with a memory layout. A memory layout defines a sequence of fields of the type, and a respective size of each field. Further, the type is associated with a memory size. The memory size includes a total size of all fields of the type.

In one or more embodiments, an underlying unspecialized type defines (or inherits) fields 626a-c. A specialized type results from the underlying unspecialized type specialized based on an anchor value 630. In an embodiment, a memory layout 634 for the specialized type may be same as or different from an underlying unspecialized type. In particular, sizes of fields 626a-c may be modified based on one or more type restrictions, or other information, indicated by the anchor value 630. Additionally or alternatively, a sequence of fields 626a-c may be modified based on one or more type restrictions, or other information, indicated by the anchor value 630. Given a modified memory layout 634, the specialized type may be associated with a different memory size than the underlying unspecialized type.

In one or more embodiments, an object of a specialized type is stored in accordance with a memory layout and/or memory size associated with the specialized type. As illustrated, for example, an object of a specialized type occupies a memory space 624 within a heap 622. The object is associated with a memory layout 634 of the specialized type. The memory layout 634 provides how fields 626a-c are stored within the memory space 624. The object is associated with a memory size of the specialized type.

In one or more embodiments, an object of a specialized type is stored in association with the specialized type. As illustrated, for example, an object of a specialized type is associated with metadata 628. The metadata 628 may be stored, for example, in a header of the object. The metadata 628 indicates an anchor value 630 providing specialization for the specialized type. The metadata 628 indicates a recorded specialized type 632 for the object. The recorded specialized type 632 is the specialized type of the object, as recorded in association with the object. The recorded specialized type 632 may be indicated, for example, using a reference to an object (such as a class mirror) representing the specialized type.

Figure 7:
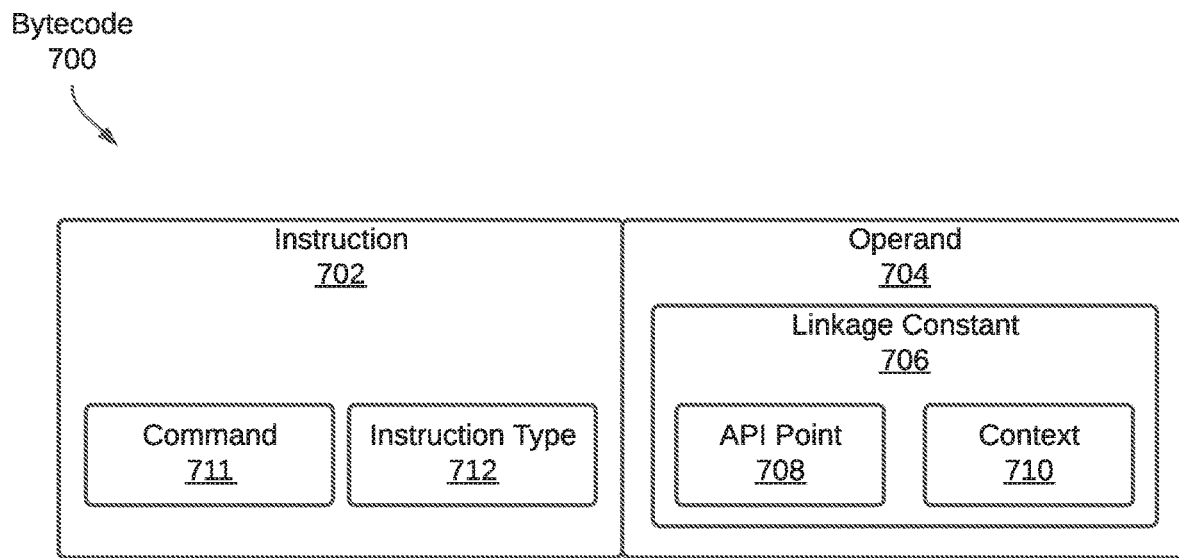
FIG. 7 illustrates a call to an API point within a particular context according to an embodiment.

FIG. 7 illustrates a call to a parametric API point according to an embodiment.

In one or more embodiments, a bytecode 700 includes an instruction 702 and an operand 704.

In one or more embodiments, an instruction 702 is associated with a command 711 and an instruction type 712. A command 711 provides an action to be executed (such as invoking a method, creating an object, accessing a field, and/or accessing a local variable). An instruction type 712 provides a type of an operand 704 (such as int, double, reference) to be operated upon using the command 711.

In an embodiment, an instruction type 712 of an instruction 702 is determined based on a context 710 associated with the instruction 702. In particular an instruction type 712 may be narrowed based on a type restriction applicable within the context 710. A compiler may translate a source code instruction to a virtual machine instruction of a narrower instruction type based on a type restriction; additionally or alternatively, an interpreter may translate a virtual machine instruction to a machine code instruction of a narrower instruction type based on a type restriction. As an example, an unspecialized field type of a particular field may be Object. An instruction operating on the particular field without specialization may be of an instruction type associated with reference, such as aload. A specialized containing type may adorn the unspecialized field type with a type restriction, restricting the particular field to values of int. The specialized containing type may be associated with a memory layout that inlines the int value for the particular field within an instance of the specialized type. Hence, an instruction operating on the particular field may treat the particular field as having a specialized field type of int. The instruction may be of an instruction type associated with int, such as iload.

In one or more embodiments, an operand 704 may be an API point 708, a linkage constant 706, and/or another data structure. Where the operand 704 is a linkage constant 706, the operand 704 adds parametric information to the API point 708 that is wrapped by the linkage constant 706 and being called. The linkage constant 706 further supplies a context 710 for the call to the API point 708. The context 710 may indicate one or more type restrictions to be applied to a type, field, method parameter, and/or method return value.

In an embodiment, a context 710 within which a same resolution state of an anchor constant is accessed may be defined by a selector value and/or an anchor value. Where the linkage constant 706 is not resolved, a context 710 is provided as a selector value. Every access to an anchor constant using a same selector value accesses the same resolution state for the anchor constant. (An access to the anchor constant using a different selector value may access a different resolution state for the anchor constant.) Where the linkage constant 706 is resolved, a context 710 is provided as a selector value and/or an anchor value. Every access to an anchor constant using a same anchor value accesses the same resolution state for the anchor constant. (An access to the anchor constant using a different anchor value may access a different resolution state for the anchor constant.)

4. Optimizing Based on Type Restrictions

Figure 8A:
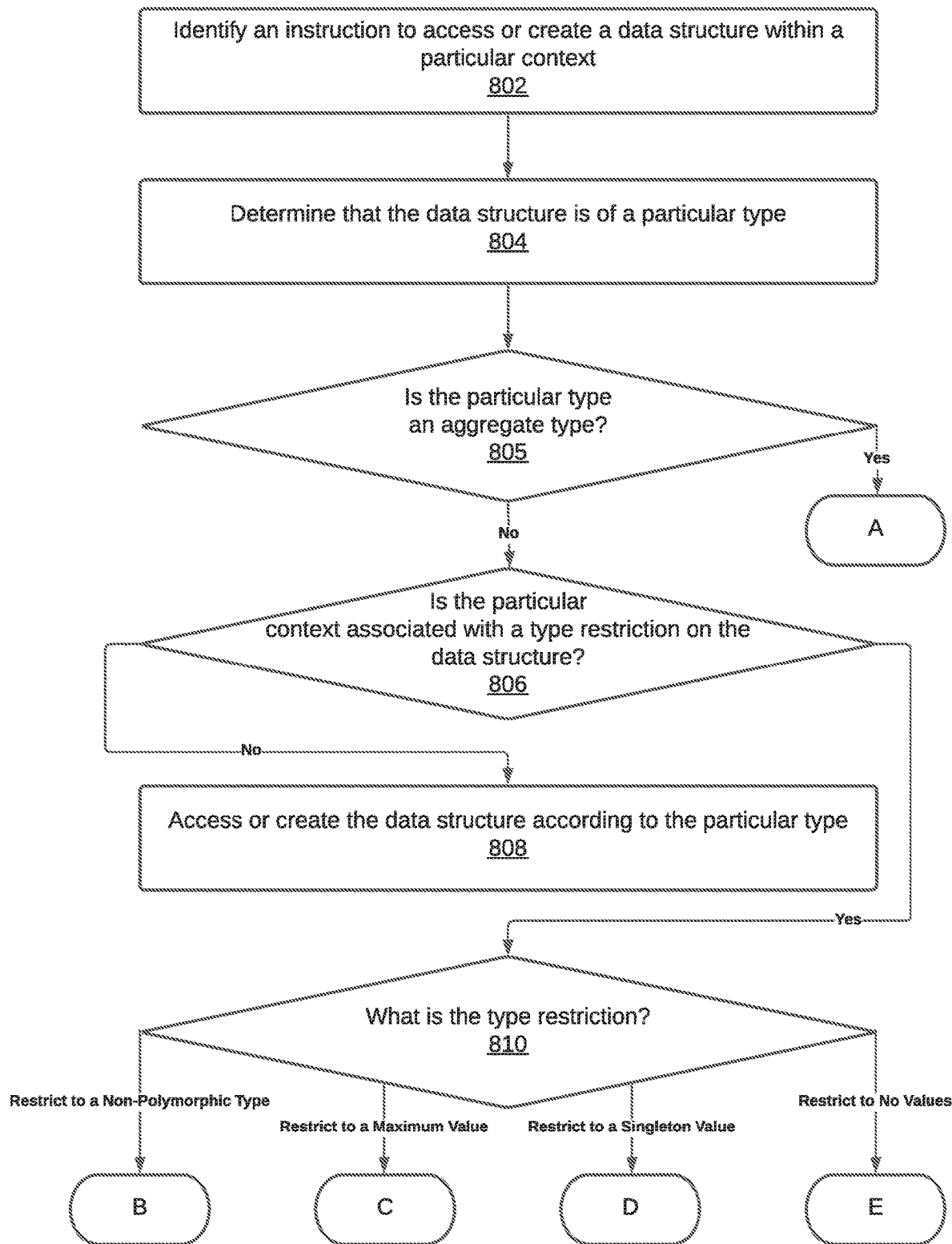
FIGS. 8A-8G illustrate an example set of operations for implementing optimizations for certain type restrictions according to an embodiment.
Figure 8B:
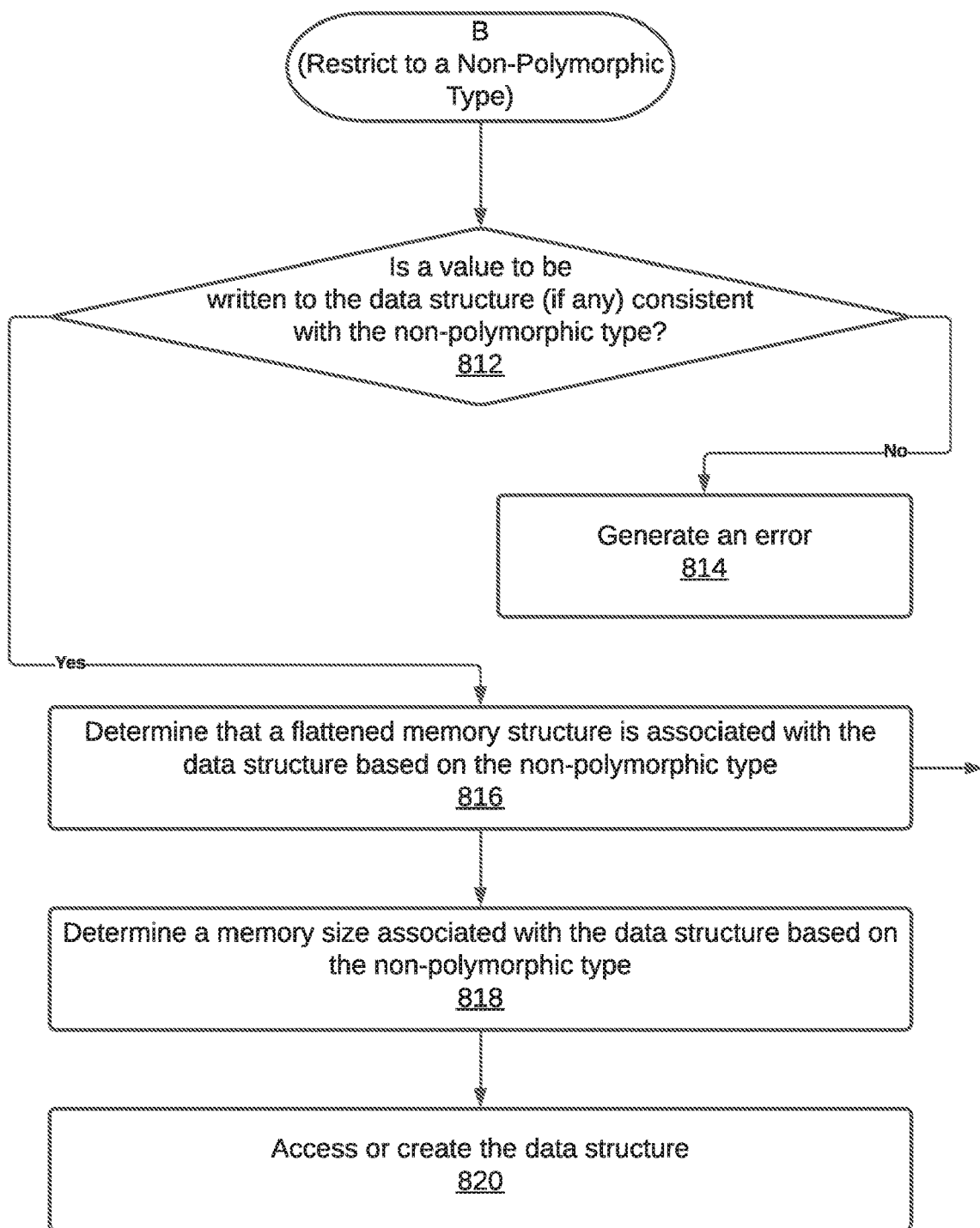
Figure 8C:
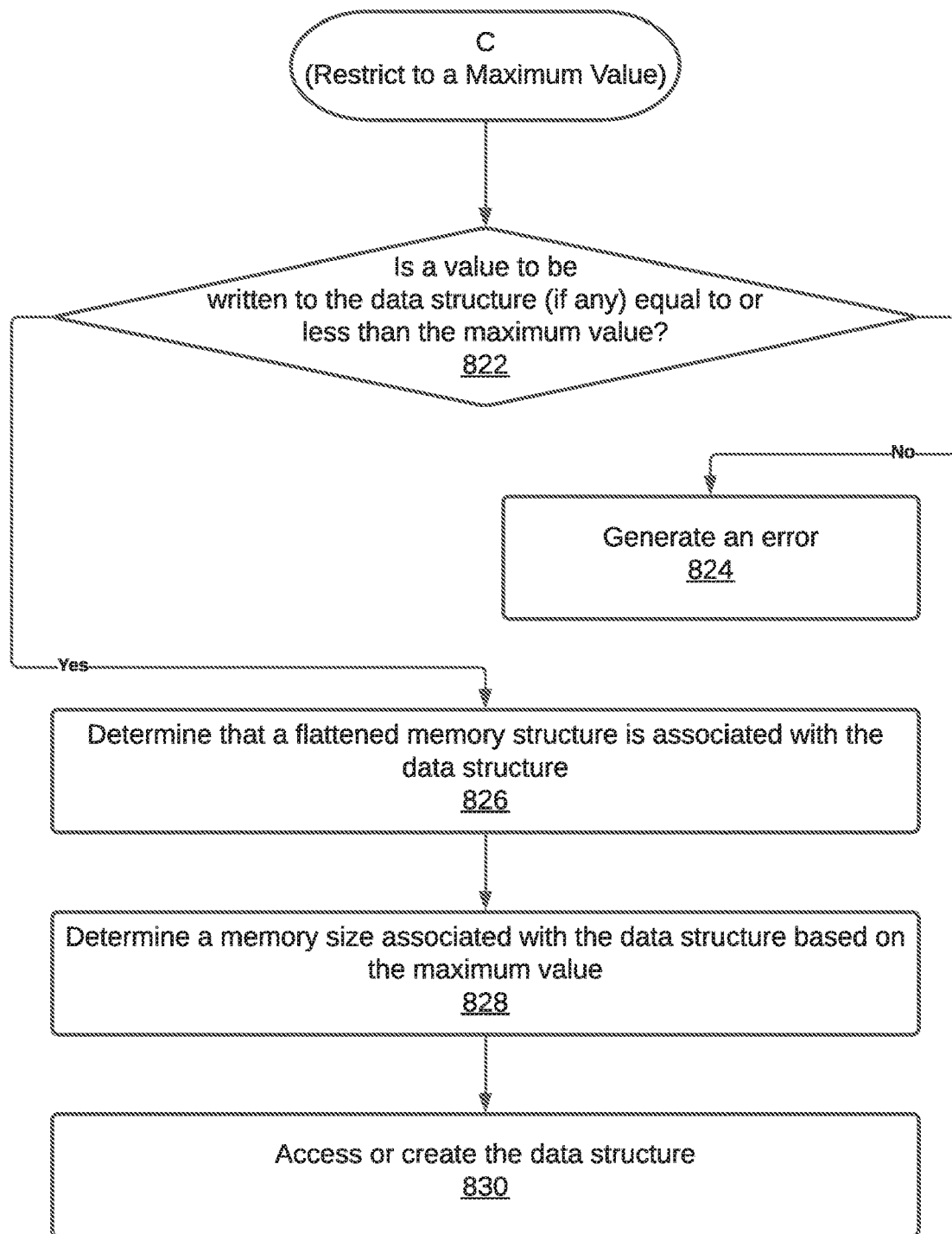
Figure 8D:
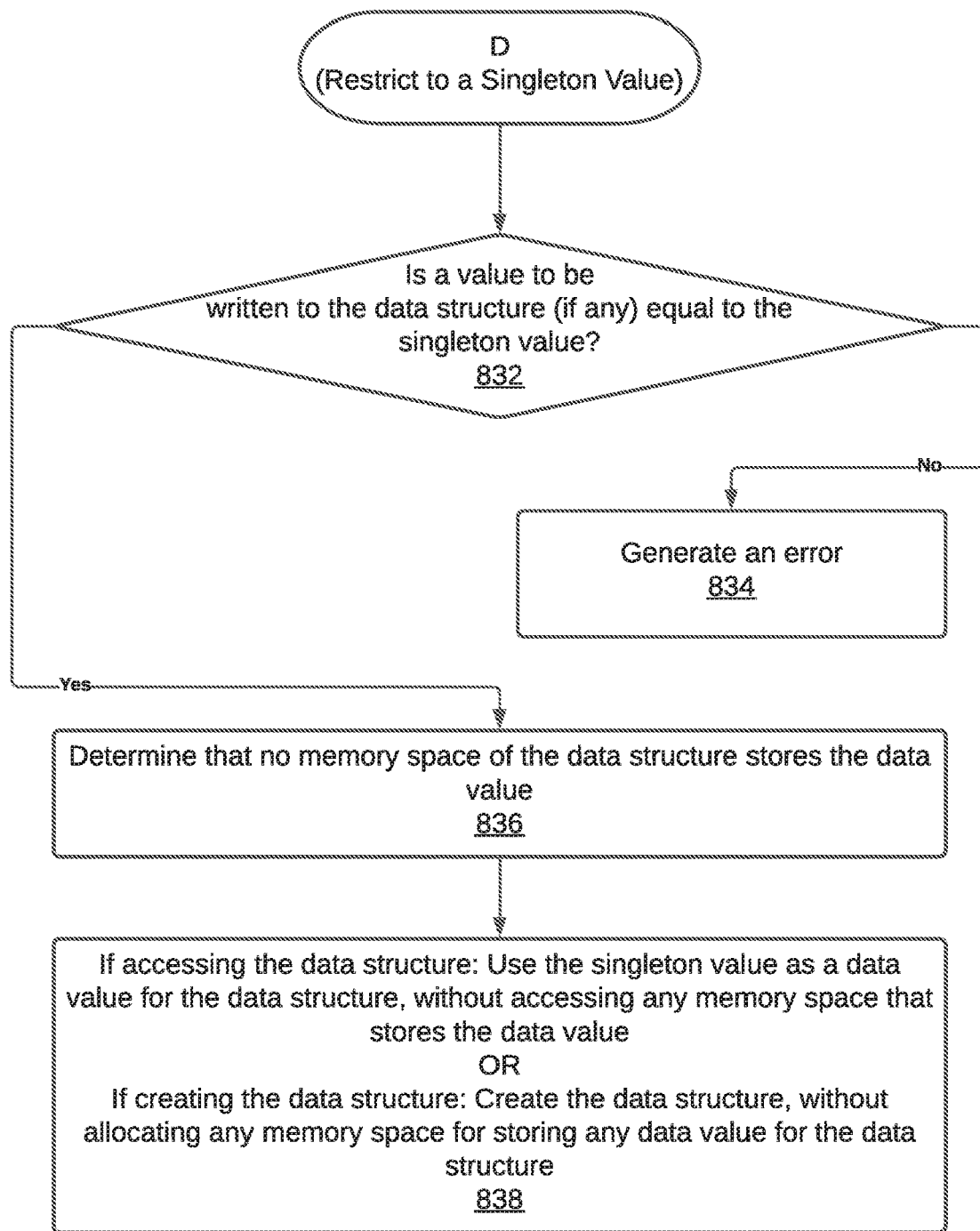
Figure 8E:
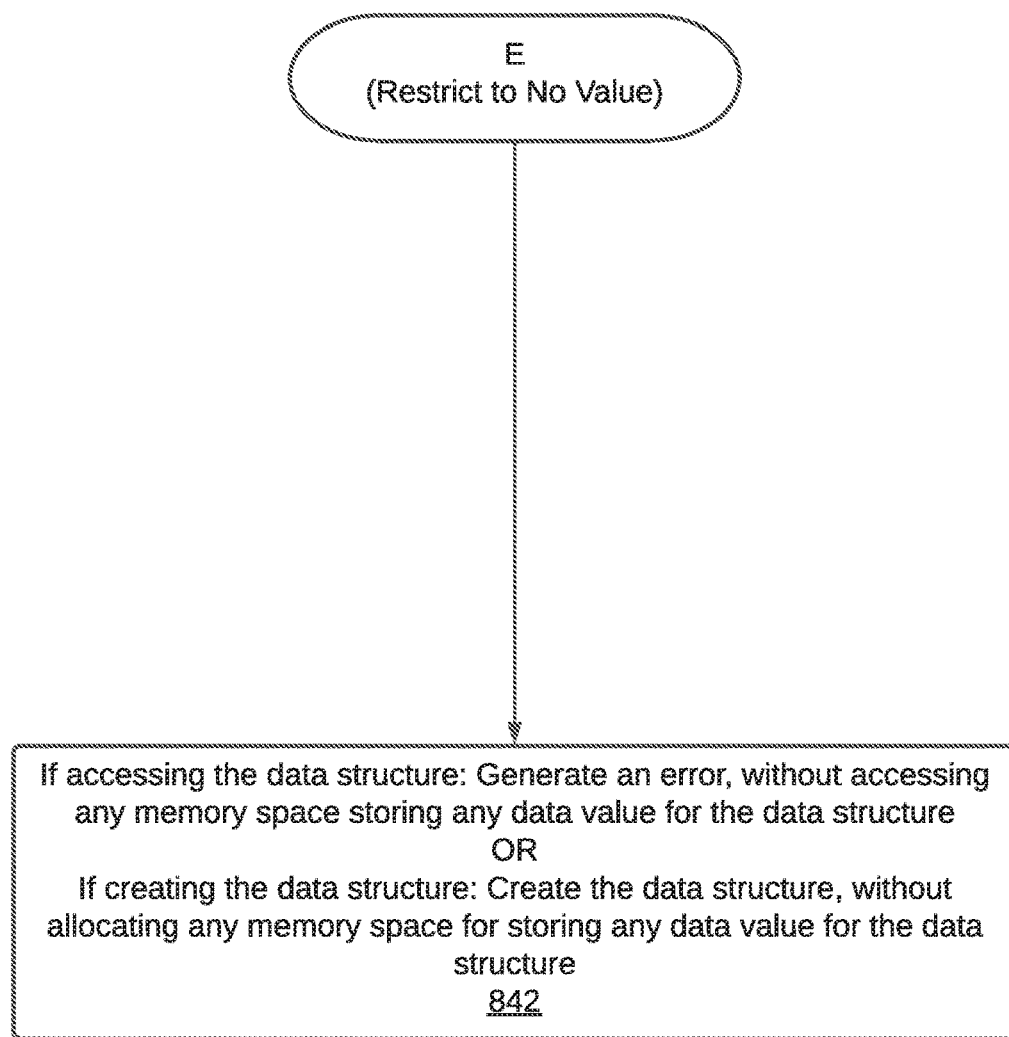
Figure 8F:
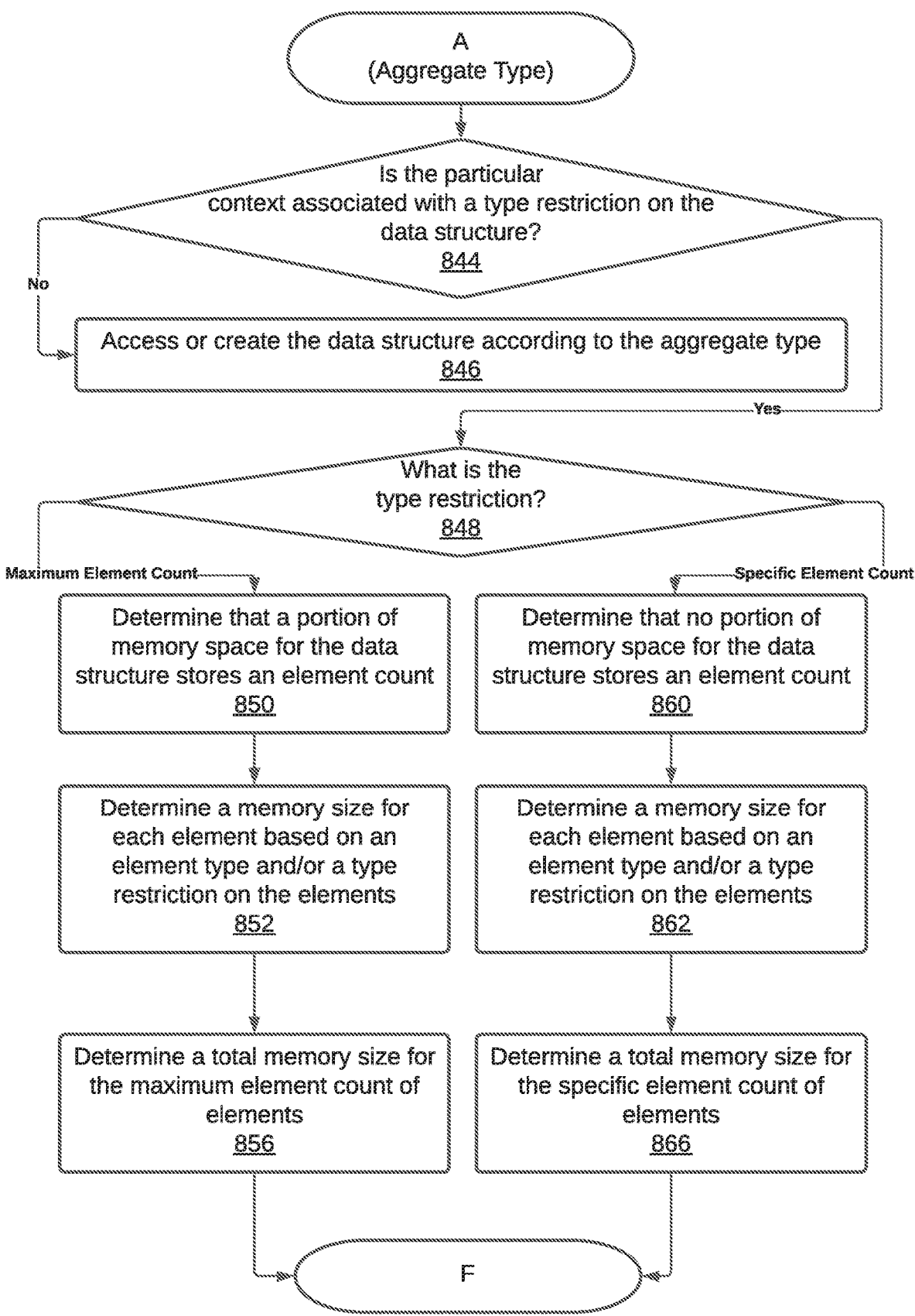
Figure 8G:
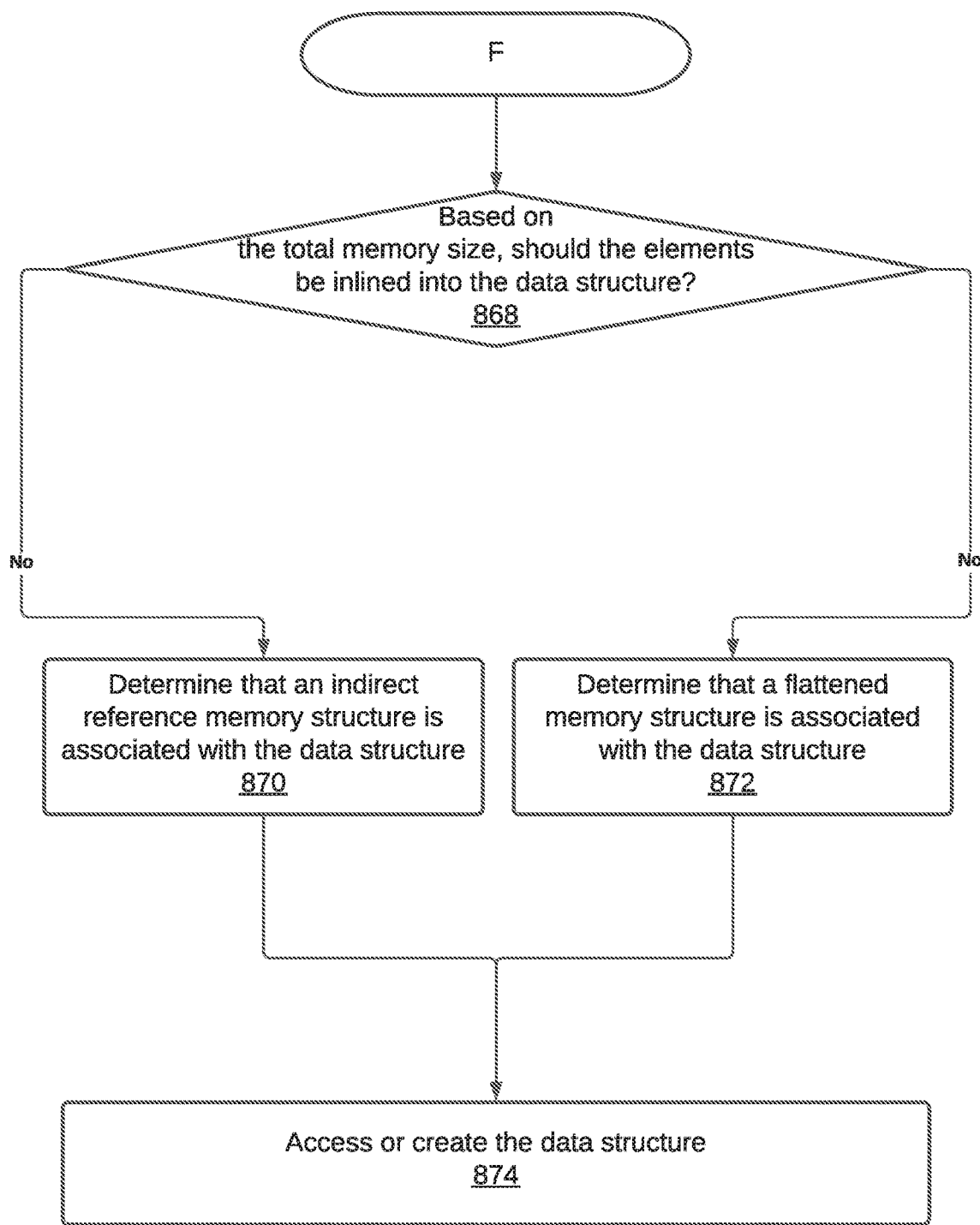
Figure 9:
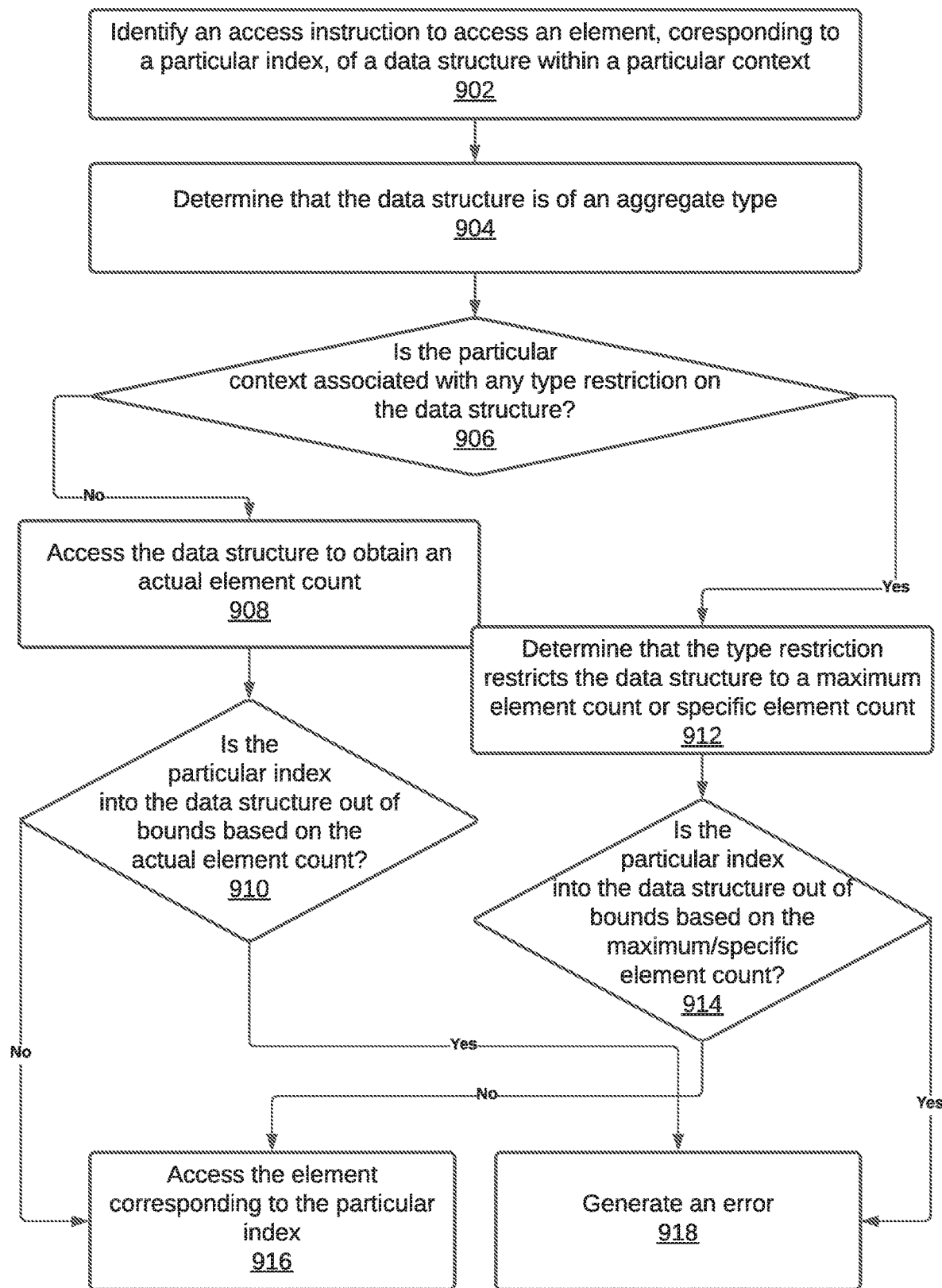
FIG. 9 illustrates another example set of operations for implementing optimizations for certain type restrictions according to an embodiment.

One or more operations illustrated in FIGS. 8A-9 may be modified, rearranged, or omitted all together. Accordingly, the particular sequence of operations illustrated in FIGS. 8A-9 should not be construed as limiting the scope of one or more embodiments.

FIGS. 8A-8G illustrate an example set of operations for implementing optimizations for certain type restrictions according to an embodiment.

One or more embodiments include identifying an instruction to access or create a data structure within a particular context (Operation 802). A runtime environment identifies an instruction to access or create a data structure within a particular context.

An instruction to access a data structure may refer to, for example, an instruction to write to the data structure, or an instruction to read from the data structure.

Where the data structure is an object, an instruction to create the data structure may refer to an instruction to instantiate a particular class. Where the data structure is a field, an instruction to create the data structure may refer to an instruction to instantiate a particular class that includes the field. Instantiating the particular class involves allocating memory space to the field. Where the data structure is a method parameter of a method, an instruction to create the data structure may refer to an instruction to invoke the method. Invoking the method involves allocating memory space to the method parameter as a local variable of a stack frame and/or on an operand stack of a stack frame. Where the data structure is a method return value, an instruction to create the data structure may refer to an instruction to invoke the method. Invoking the method involves allocating memory space to the method return value when returning from a callee method to a caller method.

Additional and/or alternative data structures may be called.

An operand of the instruction to access or create the data structure may indicate the particular context within which the data structure is to be accessed or created. If no such context is explicitly indicated, then a default context may be assumed. In an embodiment, an operand of an instruction indicates a particular context for a data structure by referencing an anchor value associated with the particular context. Additionally or alternatively, an operand of an instruction indicates a particular context for a data structure by referencing a selector value, which is used to determine an anchor value. The selector value and the anchor value are associated with the particular context.

One or more embodiments include determining that the data structure is of a particular type (Operation 804). The runtime environment determines a particular type of the data structure. The runtime environment may identify the particular type of the data structure from a descriptor associated with the data structure. For a data structure that is a field, a descriptor of the field specifies the particular type of the data structure. For a method parameter and/or method return value, a descriptor of the method specifies the particular type of the method parameter and/or method return value.

One or more embodiments include determining whether the particular type is an aggregate type (Operation 805). The runtime environment determines whether the particular type of the data structure is an aggregate type, such as an array type.

If the particular type is not an aggregate type, one or more embodiments include determining whether the particular context is associated with a type restriction on the data structure (Operation 806). The runtime environment determines whether the particular context is associated with a type restriction on the data structure. The runtime environment may identify any type restriction on the data structure from a type restriction attribute associated with the data structure.

For a data structure that is a field, a type restriction attribute of the field references a constant representing a type restriction on the field. For a method parameter and/or method return value, a type restriction attribute of the method references a constant representing a type restriction on the method parameter and/or method return value. If no type restriction attribute is associated with the data structure, then no type restriction is imposed on the data structure.

The type restriction attribute references a constant that indicates any type restriction imposed on the data structure. The constant representing a type restriction on the data structure may be, for example, an anchor constant that indicates the type restriction. If no constant is referenced, or if the constant has a resolved value of zero within the particular context, then no type restriction is applicable to the data structure within the particular context. Otherwise, if the constant has a non-zero resolved value within the particular context, then a type restriction is applicable to the data structure within the particular context.

If no type restriction is applicable, one or more embodiments include accessing or creating the data structure according to the particular type (Operation 808). The runtime environment accesses or creates the data structure according to the particular type. The data structure has a memory layout associated with the particular type. The data structure has a memory size associated with the particular type.

As an example, a field may be of the type int. A runtime environment may identify an access instruction to access the field within a particular context. The runtime environment may determine that a class file of the class defining the field specifies a type restriction attribute for the field. The type restriction attribute references a parametric constant representing a type restriction on the field. A resolved value for the parametric constant within the particular context is zero. The runtime environment determines that no type restriction is applicable to the field within the particular context. Therefore, the runtime environment processes the field according to the type int. The runtime environment provides a memory size and a memory layout to the field based on the type int. The runtime environment uses instructions of an instruction type for accessing values of int to operate on the field.

If a type restriction is applicable, one or more embodiments include determining the type restriction (Operation 810). The runtime environment determines the type restriction on the data structure. A constant representing the type restriction on the data structure may be referenced by the type restriction attribute associated with the data structure. The constant representing the type restriction may be, for example, an anchor constant. The constant representing the type restriction may be an invariant constant or a parametric constant. If an invariant constant represents the type restriction, then the type restriction applies in any context. If a parametric constant represents the type restriction, then the parametric constant may resolve to different resolved values within different contexts. One of the contexts matches the particular context within which the call to the data structure is made. A resolved value for the parametric constant within the matching context is identified. The identified resolved value indicates the type restriction on the data structure.

Various type restrictions may be used, as further described below.

If the type restriction restricts the data structure to a non-polymorphic type, one or more embodiments include determining whether a value to be written to the data structure (if any) is consistent with the non-polymorphic type (Operation 812).

If the instruction to access the data structure involves a request to write to the data structure, then a check is performed to confirm that the data value to be written conforms to the type restriction. The instruction to write to the data structure may be, for example, a request to write to a field of an object, or a request to store a value as an operand on an operand stack. In the instant scenario, the runtime environment determines whether the data value is consistent with the non-polymorphic type. As an example, a particular class may define a field, whose type is erased to the type Ob j e ct. A type restriction may restrict the field to be of the int primitive type. A runtime environment may identify a request to write a particular data value to the field. The runtime environment may check whether the data value is of the int type. If the data value is of the int type, then the data value is consistent with the int type specified by the type restriction. If the data value is not of the int type, then the data value is not consistent with the int type specified by the type restriction.

If the value to be written to the data structure is not consistent with the non-polymorphic type, one or more embodiments include generating an error (Operation 814). The runtime environment generates an error. The error may indicate that an attempt was made to write a data value that violates a type restriction.

One or more embodiments include determining that a flattened memory structure is associated with the data structure based on the non-polymorphic type (Operation 816). The runtime environment determines whether any memory optimizations may be performed based on the type restriction. Based on the type restriction restricting the data structure to the non-polymorphic type, the runtime environment determines that a flattened memory structure is associated with the data structure. Even if the data structure is associated with an unspecialized type that requires indirection, the runtime environment determines that a data value for the data structure may be directly stored and/or accessed.

As an example, a particular class may define a method, having a method parameter whose type is erased to the type Object. A type restriction may restrict the method parameter to be of the int primitive type. The method parameter without the type restriction would have required an indirect access via a reference. For example, an entry on an operand stack corresponding the method parameter would store a reference, rather than a data value for the method parameter; the reference points to a memory space within the heap, and that memory space within the heap stores the data value. However, the runtime environment may perform a memory optimization based on the type restriction. The runtime environment may determine that a flattened memory structure is associated with the method parameter. Hence, a data value for the method parameter is stored directly into an entry on an operand stack.

One or more embodiments include determining a memory size associated with the data structure based on the non-polymorphic type (Operation 818). The runtime environment determines a required memory size for the non-polymorphic type. For example, a required memory size for int is 4 bytes, and for long is 8 bytes. If the non-polymorphic type is an array type or struct type, a required memory size for the non-polymorphic type is the sum of the respective required memory sizes of each individual element and/or component. The runtime environment determines a memory size associated with the data structure based on the required memory size for the non-polymorphic type. The runtime environment may add, for example, the memory size for a header to the required memory size for the non-polymorphic type to obtain the memory size associated with the data structure.

One or more embodiments include accessing or creating the data structure (Operation 820). The runtime environment accesses or creates the data structure based on the flattened memory structure determined at Operation 816 and/or the memory size determined at Operation 818.

In creating the data structure, the runtime environment allocates memory space for the data structure based on the memory size determined at Operation 818. The runtime environment also directly stores any data value for the data structure into the allocated memory space.

In accessing the data structure, the runtime environment reads directly from the memory space corresponding to the data structure, or writes directly to the memory space corresponding to the data structure. The memory space that is accessed has the memory size determined at Operation 818.

Returning to Operation 810, if the type restriction restricts the data structure to a maximum value, one or more embodiments include determining whether a value to be written to the data structure (if any) is equal to or less than the maximum value (Operation 822).

If the instruction to access the data structure involves a request to write to the data structure, then a check is performed to confirm that the data value to be written conforms to the type restriction. In the instant scenario, the runtime environment determines whether the data value is equal to or less than the maximum value. Examples of operations for checking whether a data value to be written conforms to a type restriction are described above with reference to Operation 812.

If the value to be written to the data structure is not equal to or less than the maximum value, one or more embodiments include generating an error (Operation 824). The runtime environment generates an error. The error may indicate that an attempt was made to write a data value that violates a type restriction.

One or more embodiments include determining that a flattened memory structure is associated with the data structure (Operation 826). The runtime environment determines whether any memory optimizations may be performed based on the type restriction. Based on the type restriction restricting the data structure to the maximum value, the runtime environment determines that a flattened memory structure is associated with the data structure. Examples of operations for flattening a memory structure are described above with reference to Operation 816.

One or more embodiments include determining a memory size associated with the data structure based on the maximum value (Operation 828). The runtime environment determines a required memory size for storing the maximum value. As an example, if the maximum value is 7, a runtime environment may determine that a required memory size for storing the maximum value is only 3 bits. However, if the maximum value is 255, then the runtime environment may determine that a required memory size for storing the maximum value is 8 bits, or 1 byte.

One or more embodiments include accessing or creating the data structure (Operation 830). The runtime environment accesses or creates the data structure based on the flattened memory structure determined at Operation 826 and/or the memory size determined at Operation 828. Examples of operations for accessing or creating the data structure are described above with reference to Operation 820.

Returning to Operation 810, if the type restriction restricts the data structure from assuming any value other than a singleton value, one or more embodiments include determining whether the value to be written to the data structure (if any) is equal to the singleton value (Operation 832).

If the instruction to access the data structure involves a request to write to the data structure, then a check is performed to confirm that the data value to be written conforms to the type restriction. In the instant scenario, the runtime environment determines whether the data value is equal to the singleton value. Examples of operations for checking whether a data value to be written conforms to a type restriction are described above with reference to Operation 812.

If the data value to be written to the data structure is not the singleton value, one or more embodiments include generating an error (Operation 834). The runtime environment generates an error. The error may indicate that an attempt was made to write a data value that violates a type restriction.

One or more embodiments include determining that no memory space of the data structure stores the data value (Operation 836). The runtime environment determines whether any memory optimizations may be performed based on the type restriction. Based on the type restriction restricting the data structure to the singleton value, the runtime environment determines that no memory space of the data structure needs to store the data value of the data structure. Metadata of the data structure may store, directly or indirectly, a reference to the type restriction restricting the data structure to the singleton value; however, no memory space for storing the data value for the data structure is necessary. If the type restriction were not present, the data structure would have memory space for storing the data value.

If the instruction received at Operation 802 is an instruction to access the data structure, one or more embodiments include using the singleton value as a data value for the data structure, without accessing any memory space of the data structure that stores the data value. Or, if the instruction received at Operation 802 is an instruction to create the data structure, one or more embodiments include creating the data structure, without allocating any memory space for storing any data value for the data structure (Operation 838).

In an embodiment, the data structure is a field, and the type restriction is imposed on the field. An instantiation instruction to allocate memory for an object including the field constitutes an instruction to create the field. Creating the data structure (that is, the field), without allocating any memory space for storing any data value for the data structure, involves allocating memory space to the object, without allocating any portion of the memory space for the object being used for storing the data value for the field. In an embodiment, the runtime environment may allocate no memory space to the field at all.

As an example, a particular class may have two fields, being of Object and Boolean respectively. The size of a reference (for Object) is 4 bytes; the size of Boolean is 1 byte. The memory layout associated with the particular class, without any type restrictions, may be:

TABLE 1

| Offset | Size | Description |
| --- | --- | --- |
| 0 | 12 | (object header) |
| 12 | 4 | Object field |
| 16 | 1 | Boolean field |

The first 12 bytes stores the object header. The object header may store metadata, such as a reference to an object representing the particular class. The next 4 bytes stores the Object field, which stores a reference, which is 4 bytes. The reference points to a memory location within a heap where a data value for the Object field may be stored (and/or additional reference(s) may be stored). The next 1 byte stores the Boolean field, which directly stores a data value for the Boolean field.

A runtime environment may identify an instruction to instantiate the particular class, that is, to create an object of the particular class. The instruction may specify that the object is be created within a particular context. The particular context may be associated with a type restriction restricting the Object field to a singleton value (say, "2"). Due to the singleton type restriction, the runtime environment may determine that no memory space is needed for the Object field. Hence, the runtime environment may allocate memory space according to the following memory layout:

TABLE 2

| Offset | Size | Description |
|---|---|---|
| 0 | 12 | (object header) |
| 12 | 0 | Object field |
| 12 | 1 | Boolean field |

The first 12 bytes stores the object header. The object header may store metadata, such as a reference to an object representing a specialized version of the particular class. The specialized version of the particular class may be associated with a type restriction on the Object field, restricting the Object field to the value of "2." The next portion of memory should store the Object field, but since the Object field is restricted to a singleton value, no memory space is actually needed. So zero bytes are allocated to the Object field. The next 1 byte, directly following the object header, stores the Boolean field, which directly stores a data value for the Boolean field In an embodiment, the data structure is a field, and the type restriction is imposed on the field. A read instruction to read from the field of an object constitutes an instruction to access the field. Using the singleton value as a data value for the data structure involves returning the singleton value as the data value for the field of the object, without accessing any memory space of the field of the object storing the data value. The object may include a reference to an anchor value; the anchor value may reference the type restriction; the type restriction may indicate the singleton value. However, no portion of any memory space allocated to the field of the object stores the data value (which is the singleton value) for the field. Hence, reading the field does not involve accessing any memory space of the field of the object storing the data value. Conversely, where the field is accessed without the type restriction, memory space allocated to the field of the object is configured to store the data value for the field, and the data value is read from the memory space.

In an embodiment, the data structure is a field, the type restriction is imposed on the field. A write instruction to write to the field of an object constitutes an instruction to access the field. Using the singleton value as a data value for the data structure involves indicating that the singleton value has been written as the first data value for the field of the first object, without writing any data value to any memory space of the field of the first object configured to store the first data value. The object may include a reference to an anchor value; the anchor value may reference the type restriction; the type restriction may indicate the singleton value. However, no portion of any memory space allocated to the field of the object stores the data value (which is the singleton value) for the field. Hence, writing to the field does not involve writing any data value to any memory space of the field of the first object configured to store the first data value. Conversely, where the field is accessed without the type restriction, memory space allocated to the field of the object is configured to store the data value for the field, and the data value is written to the memory space.

In an embodiment, the data structure is a method parameter of a method, and the type restriction is imposed on the method parameter. An invocation instruction to invoke the method constitutes both an instruction to create the method parameter and an instruction to write to the method parameter. Creating the data structure (that is, the method parameter), without allocating any memory space for storing any data value for the data structure, involves allocating memory space for local variables within a stack frame corresponding to the execution of the method, wherein no portion of the memory space for local variables corresponds to the method parameter. Further, using the singleton value as a data value for the data structure involves performing an execution of the method using the singleton value as an argument for the method parameter, without assessing any memory space for local variables that corresponds to the method parameter. Conversely, where the method is invoked without the type restriction, an argument for the method parameter would be passed to a stack frame corresponding to execution of the method, the argument would be stored into the memory space for local variables within the stack frame, and the argument would be accessed from the local variables.

In an embodiment, the data structure is a method parameter of a method, and the type restriction is imposed on the method parameter. A load instruction to load a local variable corresponding to the method parameter onto an operand stack constitutes both an instruction to create the method parameter and an instruction to write to the method parameter. Creating the data structure (that is, the method parameter), without allocating any memory space for storing any data value for the data structure, involves refraining from allocating any memory space on an operand stack of the stack frame for the method parameter. Further, using the singleton value as a data value for the data structure involves performing an execution of the method using the singleton value as an argument for the method parameter, without assessing any memory space of the operand stack that corresponds to the method parameter. Conversely, where the method is invoked without the type restriction, an argument for the method parameter would be stored as a local variable in a stack frame corresponding to execution of the method; the loaded variable would be loaded as an operand onto an operand stack in the stack frame; and the operand would then be operated upon during execution of the method.

In an embodiment, the type restriction is imposed on a method return value of a method. A return instruction to return the method return value from execution of the method constitutes both an instruction to create the method return value and an instruction to write to the method return value. Creating the data structure (that is, the method return value), without allocating any memory space for storing any data value for the data structure, involves refraining from allocating any memory space on an operand stack of the stack frame for the method return value. Using the singleton value as a data value for the data structure involves returning to a caller method, without passing the singleton value as the method return value from a stack frame corresponding to execution of the callee method to another stack frame corresponding to execution of the caller method. The runtime environment does not access any memory space of the operand stack that corresponds to the method return value. Conversely, where the method is invoked without the type restriction, a method return value is passed from a stack frame corresponding to execution of a callee method to another stack frame corresponding to execution of a caller method. A method return value stored on an operand stack in a stack frame corresponding to the execution of the callee method is copied and stored onto an operand stack in a stack frame corresponding to the execution of the caller method.

Referring back to Operation 810, if the type restriction restricts the data structure from assuming any value at all, and if the instruction received at Operation 802 is an instruction to access the data structure, one or more embodiments include generating an error. Or, if the type restriction restricts the data structure from assuming any value at all, and if the instruction received at Operation 802 is an instruction to create the data structure, one or more embodiments include creating the data structure, without allocating any memory space for storing any data value for the data structure (Operation 842).

In an embodiment, the data structure is a field, and the type restriction is imposed on the field. An instantiation instruction to allocate memory for an object including the field constitutes an instruction to create the field. Examples for creating the field, without allocating any memory space for storing any data value for the data structure, are described above with reference to Operation 838.

In an embodiment, the data structure is a field, and the type restriction is imposed on the field. A read instruction to read from the field of an object, or a write instruction to write to the field of the object, constitutes an instruction to access the field. The runtime environment generates an error, without accessing any memory space allocated for storing a data value for the field of the object. The error is generated prior to any attempt to read from any memory space allocated for storing a data value for the field of the first object. Alternatively, the error is generated prior to any attempt to write to any memory space allocated for storing a data value for the field of the first object. Conversely, where the field is accessed without the type restriction, a data value is read from or written to the memory space allocated to the field of the object.

In an embodiment, the data structure is a method parameter of a method, and the type restriction is imposed on the method parameter. An invocation instruction to invoke the method constitutes both an instruction to create the method parameter and an instruction to write to the method parameter. Creating the data structure (that is, the method parameter), without allocating any memory space for storing any data value for the data structure, involves allocating memory space for local variables within a stack frame corresponding to the execution of the method, wherein no portion of the memory space for local variables corresponds to the method parameter. However, prior to attempting to read from or write to the method parameter, the runtime environment generates an error. Hence, the error is generated, without executing any operation of the method responsive to the invocation instruction. In an alternative embodiment, the runtime environment may generate an error prior to creating the data structure. The runtime environment does not allocate any memory space for the stack frame corresponding to execution of the method at all. The runtime environment generates the error prior to pushing any stack frame corresponding to execution of the method onto the call stack. Conversely, where the method is invoked without the type restriction, a stack frame corresponding to execution of the method is pushed onto the call stack, and the method is executed.

In an embodiment, the type restriction is imposed on a method return value of a method. A return instruction to return the method return value from execution of the method constitutes both an instruction to create the method return value and an instruction to write to the method return value. Creating the data structure (that is, the method return value), without allocating any memory space for storing any data value for the data structure, involves refraining from allocating any memory space on an operand stack of the stack frame for the method return value. However, prior to attempting to pass any return value from a stack frame corresponding to execution of the callee method to another stack frame corresponding to execution of a caller method, the runtime environment generates an error. Hence, the error is generated subsequent to executing one or more operations of the method and prior to returning the method return value. As an example, a method may include an operation that performs a diagnostic. The method may be associated with a method return value that is type-restricted to assume no value. Responsive to invocation of the method, the error associated with returning the method return value is generated after performing the diagnostic. Conversely, where a callee method is invoked without the type restriction, the callee method is executed, and a method return value is returned to a caller method. The method return value is passed from a stack frame corresponding to execution of the callee method to another stack frame corresponding to execution of the caller method.

Referring back to Operation 805, if the particular type of the data structure is an aggregate type, one or more embodiments include determining whether the particular context is associated with a type restriction on the data structure (Operation 844).

In an embodiment, the instruction received at Operation 802 is a creation instruction to create an object of a particular class within the particular context. The runtime environment determines a field type of a field in the particular type based on a descriptor of the field. The descriptor of the field may be associated with an information structure for the field. The information structure for the field may be specified by a class file for the particular type. The runtime environment may determine that the field type of the field is an aggregate type.

In an embodiment, the instruction received at Operation 802 is an invocation instruction to invoke a method within the particular context. The runtime environment determines a parameter type of a method parameter of the method based on a descriptor of the method. Additionally or alternatively, the runtime environment determines a return type of a method return value of the method based on the descriptor of the method. The descriptor of the method may be associated with an information structure for the method. The information structure for the method may be specified by a class file for a type defining the method. The runtime environment may determine that the parameter type and/or return type is an aggregate type.

Examples of operations for determining whether a context is associated with a type restriction on a data structure are described above with reference to Operation 806.

If no type restriction is applicable, one or more embodiments include accessing or creating the data structure according to the aggregate type (Operation 846). The runtime environment accesses or creates the data structure according to the aggregate type. The data structure has a memory layout associated with the aggregate type. The data structure has a memory size associated with the aggregate type.

As an example, a particular class may include a particular field of the aggregate type int [ ]. The aggregate type int [ ] refers to an array of elements, where the element type is int. A runtime environment may identify an instantiation instruction to instantiate the particular class. The runtime environment allocates a memory space for the object. The memory space for the object includes memory space for storing a reference corresponding to the particular field. The memory space for storing the reference may be, for example, 4 bytes. The runtime environment therefore creates the field based on a memory layout for an array of int's.

If a type restriction is applicable, one or more embodiments include determining the type restriction (Operation 848). Examples of operations for determining the type restriction are described above with reference to Operation 810.

Various type restrictions may be used, as further described below. In an embodiment, the runtime environment determines that the type restriction restricts the data structure to a maximum element count or specific element count. A maximum element count provides a largest number of elements that the data structure is permitted to hold. As an example, a type restriction may require that a data structure holds one to ten elements. Ten is the maximum element count for the data structure. A specific element count provides a specific number of elements that the data structure is permitted to hold. As an example, a type restriction may require that a data structure holds three elements. Three is the specific element count for the data structure.

If the type restriction restricts the data structure to a maximum element count, one or more embodiments include determining that a portion of the memory space for the data structure stores an element count (Operation 850). The runtime environment determines that a portion of the memory space for the data structure stores an element count. The element count may be stored in the object header (and/or other metadata) of the object of the aggregate type.

One or more embodiments include determining a memory size for each element based on an element type and/or a type restriction on the elements (Operation 852). If there is no type restriction on the elements, then the runtime environment determines a memory size for each element based on an element type. The runtime environment identifies the element type from a field descriptor or a method descriptor.

If there is a type restriction on the elements, then the runtime environment determines whether any memory optimizations may be performed based on the type restriction. The runtime environment may determine a memory size based on the type restriction. As an example, a particular class may include a field of the type Object [ ]. A type restriction on the field may restrict the element type to Boolean. Without the type restriction, the runtime environment may determine that a memory size for each element is 4 bytes (which is the memory space needed for a reference). Based on the type restriction, the runtime environment may determine that a memory size for each element is only 1 byte (which is the memory space needed for a Boolean). Further examples of memory optimizations are described above with reference to Operations 816-818, 826-828, 836, 842.

One or more embodiments include determining a total memory size for the maximum element count of elements (Operation 856). The runtime environment determines a product of the maximum element count and the memory size for each element. The product is a total memory size. As an example, a method parameter may be of an aggregate type int [ ]. A type restriction may restrict the method parameter to a maximum of 10 elements. A memory size of int is 4. Hence a total memory size for the elements of the method parameter is 10×4=40 bytes.

Returning to Operation 848, if the type restriction restricts the data structure to a specific element count, one or more embodiments include determining that no portion of the memory space for the data structure stores an element count (Operation 860). The runtime environment determines that no portion of the memory space for the data structure stores an element count. The element count is not stored in the object header (and/or other metadata) of the object of the aggregate type. Based on the type restriction, the data structure is known to be of the specific element count. The data structure itself need not directly store the element count.

One or more embodiments include determining a memory size for each element based on an element type and/or a type restriction on the elements (Operation 862). Examples of operations for determining a memory size of each element are described above with reference to Operation 852.

One or more embodiments include determining a total memory size for the specific element count of elements (Operation 866). The runtime environment determines a product of the specific element count and the memory size for each element. The product is a total memory size. As an example, a method parameter may be of an aggregate type int [ ]. A type restriction may restrict the method parameter to specifically 10 elements. A memory size of int is 4. Hence a total memory size for the elements of the method parameter is 10×4=40 bytes.

One or more embodiments include determining whether the elements should be inlined into the data structure based on the total memory size (Operation 868). The runtime environment evaluates the total memory size against one or more criteria to determine whether the elements should be inlined into the data structure. As an example, a runtime environment may compare the total memory size with a threshold value; if the total memory size is less than the threshold value, then the elements are inlined; else the elements are not inlined.

If the elements should not be inlined, one or more embodiments include determining that an indirect reference memory structure is associated with the data structure (Operation 870). The runtime environment determines that an indirect reference memory structure is associated with the data structure. An indirect reference memory structure includes storing a reference that refers to a memory address within a heap. As an example, if the data structure is a field, then the object has a memory layout with a specific index for storing the field. A reference is stored at the index. The reference points to a memory address within the heap that stores the data value for the field. As another example, if the data structure is a method parameter, then the stack frame includes a local variable for storing the method parameter. A reference is stored at the local variable entry. The reference points to a memory address within the heap that stores the data value for the method parameter. Additionally or alternatively, the stack frame includes an operand stack for storing the method parameter. A reference is stored at the operand stack entry. The reference points to a memory address within the heap that stores the data value for the method parameter.

If the elements should be inlined, one or more embodiments include determining that a flattened memory structure is associated with the data structure (Operation 870). The runtime environment determines that a flattened memory structure is associated with the data structure. A flattened memory structure includes directly storing a data value. As an example, if the data structure is a field, then the object has a memory layout with a specific index for storing the field. A data value for the field is directly stored at the index. As another example, if the data structure is a method parameter, then the stack frame includes a local variable for storing the method parameter. A data value for the method parameter is stored directly at the local variable entry. Additionally or alternatively, the stack frame includes an operand stack for storing the method parameter. A data value for the method parameter is stored directly at the operand stack entry.

One or more embodiments include accessing or creating the data structure (Operation 874). The runtime environment accesses or creates the data structure based on (a) whether any memory space is allocated for storing an element count, determined at Operation 850 or 860, (b) whether an indirect reference or flattened memory structure is used, determined at Operation 870 or 872, and (c) if a flattened memory structure is used, a total memory size of the elements, determined at Operation 856 or 866.

As an example, a runtime environment may identify an instruction to create a data structure of an aggregate type within a particular context. The runtime environment may determine no memory space for storing an element count is needed, a flattened memory structure is used, and a total memory size of the elements is 12 bytes. The runtime environment therefore allocates memory space for the data structure to accommodate (a) a header that does not store the element count and (b) a total memory size for the elements of 12 bytes. The data values for the elements are stored directly in the data structure.

As another example, a runtime environment may identify an instruction to create a data structure of an aggregate type within a particular context. The runtime environment may determine memory space for storing an element count is needed, and an indirect reference memory structure is used. The runtime environment therefore allocates memory space for the data structure to accommodate (a) a header that does store the element count and (b) 4 bytes for storing a reference to the heap. The data values for the elements are stored in the heap.

FIG. 9 illustrates another example set of operations for implementing optimizations for certain type restrictions according to an embodiment. In particular, a runtime environment accesses an element of an aggregate data structure that is restricted to a maximum element count or a specific element count.

One or more embodiments include identifying an access instruction to access an element, corresponding to a particular index, of a data structure within a particular context (Operation 902). A runtime environment identifies an access instruction to access an element, corresponding to a particular index, of a data structure within a particular context. The access instruction may be, for example, a read instruction to read from a heap, or a load instruction to load from a local variable, or a read instruction to read from an operand stack.

In an embodiment, an operand of the access instruction indicates the particular context by referencing an anchor value associated with the particular context. Additionally or alternatively, an operand of the creation instruction indicates the particular context by referencing a selector value, which is used to determine an anchor value. The selector value and the anchor value are associated with the particular context.

One or more embodiments include determining that the data structure is of an aggregate type (Operation 904). The runtime environment determines that the data structure is of an aggregate type. Examples of operations for determining that a data structure is of an aggregate type are described above with reference to Operation 844 (with respect to Operation 805).

One or more embodiments include determining whether the particular context is associated with any type restriction on the data structure (Operation 906). Examples of operations for determining whether a context is associated with any type restriction on a data structure are described above with reference to Operation 806.

If no type restriction applies, one or more embodiments include accessing the data structure to obtain an actual element count (Operation 908). The runtime environment accesses the data structure to determine an actual element count. The actual element count may be stored in a header (and/or other metadata) of the data structure.

One or more embodiments include determining whether the particular index into the data structure is out of bounds based on the actual element count (Operation 910). The runtime environment determines a maximum index corresponding to a last element of the data structure based on the actual element count. The runtime environment compares the particular index, specified by the instruction received at Operation 902, and the maximum index. If the particular index is greater than the maximum index, then the particular index is out of bounds. Otherwise if the particular index is not greater than the maximum index, the particular index is not out of bounds.

Referring back to Operation 906, if a type restriction applies, one or more embodiments include determining that the type restriction restricts the data structure to a maximum element count or specific element count (Operation 912). The runtime environment determines the type restriction on the data structure. Examples of operations for determining the type restriction are described above with reference to Operations 810 and 848.

One or more embodiments include determining whether the particular index into the data structure is out of bounds based on the maximum element count or specific element count (Operation 914). The runtime environment determines a maximum index corresponding to a last possible element of the data structure based on the maximum element count or specific element count. The runtime environment compares the particular index, specified by the instruction received at Operation 902, and the maximum index. If the particular index is greater than the maximum index, then the particular index is out of bounds. Otherwise if the particular index is not greater than the maximum index, the particular index is not out of bounds.

As an example, a type restriction may restrict a data structure to a maximum element count of five. The elements of the data structure are indexed starting from zero, such that the first element has an index of zero. An access to an element corresponding to an index of five is attempted. Based on the maximum element count of five, a maximum index corresponding to a last possible element would be four. The index of five, specified by the access instruction, is greater than the maximum index of four. Therefore, the index of five is out of bounds.

If the particular index is not out of bounds based on Operation 910 or 914, one or more embodiments include accessing the element corresponding to the particular index (Operation 916). The runtime environment accesses the element, corresponding to the particular index, of the data structure.

If the particular index is out of bounds based on Operation 910 or 914, one or more embodiments include generating an error (Operation 918). The runtime environment generates an error. The error may indicate that an index that is out of bounds is referenced in an attempt to access an element of an aggregate data structure. The error may but does not necessarily indicate that the out of bounds determination is made based on a type restriction on an element count of the aggregate data structure.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable storage media storing instructions which, when executed by one or more hardware processors, cause:
    identifying, by a runtime environment, a first command to create a first data structure within a first context;
    determining, by the runtime environment, that the first data structure is of an aggregate type;
    determining, by the runtime environment, that the first context is associated with a type restriction restricting the first data structure to a specific element count;
        wherein an element count other than the specific element count is valid for the aggregate type;
    based on the type restriction restricting the first data structure to the specific element count: determining, by the runtime environment, that no memory space of the first data structure stores a first actual element count of the first data structure;
    creating the first data structure, by the runtime environment, wherein creating the first data structure comprises allocating a first memory space to the first data structure, without allocating any memory space for storing the first actual element count of the first data structure.

2. The media of claim 1, wherein the first memory space allocated to the first data structure stores information indicating that the type restriction applies to the first data structure.

3. The media of claim 1, wherein the first memory space allocated to the first data structure is located within one of: an operand stack, a local variable structure, or a heap.

4. The media of claim 1, wherein:
    the first data structure comprises a field of an object; and
    creating the first data structure is performed as part of creating the object.

5. The media of claim 1, storing the instructions which further cause:
    identifying a second command to create a second data structure within a different context;
    determining that the second data structure is of the aggregate type;
    wherein the different context is not associated with the type restriction restricting the second data structure to any specific element count;
    creating the second data structure, wherein creating the second data structure comprises allocating a second memory space of a non-zero memory size for storing a second actual element count of the second data structure.

6. The media of claim 5, storing the instructions which further cause:
    the first data structure comprises a field of a first object and the second data structure comprises the field of a second object; and
    a descriptor of the field indicates that the field is of a particular type.

7. The media of claim 5, wherein:
    the first data structure comprises one of a method parameter or method return value of a method during a first execution of the method and the second data structure comprises one of the method parameter or method return value of the method during a second execution of the method;
    a descriptor of the method indicates that one of the method parameter or method return value of the method is of a particular type.

8. The media of claim 5, wherein:
    a first set of one or more operands of the first command indicates the first context; and
    no operand of the second command indicates the first context.

9. One or more non-transitory computer readable storage media storing instructions which, when executed by one or more hardware processors, cause:
    identifying, by a runtime environment, a first command to perform at least one of: (a) create a first data structure within a first context, or (b) access the first data structure within the first context;
    determining, by the runtime environment, that the first data structure is of an aggregate type;

determining, by the runtime environment, that the first context is associated with a type restriction restricting the first data structure to a maximum element count; wherein an element count greater than the maximum element count is valid for the aggregate type;

based on the type restriction restricting the first data structure to the maximum element count: determining, by the runtime environment, a total memory size for the maximum element count of a first set of elements of the first data structure;

determining, by the runtime environment, whether the first set of elements of the first data structure should be inlined into the first data structure based on the total memory size;

responsive to determining that the first set of elements of the first data structure should be inlined into the first data structure: performing, by the runtime environment, at least one of creating or accessing the first data structure based on an inlined memory structure.

10. The one or more media of claim 9, wherein a memory space allocated to the first data structure is located within one of: an operand stack, a local variable structure, or a heap.

11. The media of claim 9, wherein:
the first data structure comprises a field of an object; and
creating the first data structure is performed as part of creating the object.

12. The one or more media of claim 9, wherein:
determining the total memory size for the maximum element count of the first set of elements of the first data structure comprises:
   determining an individual memory size for each of the first set of elements based on one or more of: a first type of the first set of elements and a first type restriction on the first set of elements; and
   determining a product of the individual memory size and the maximum element count as the total memory size.

13. The one or more media of claim 9, wherein:
determining whether the first set of elements of the first data structure should be inlined into the first data structure based on the total memory size comprises: determining whether the total memory size is equal to or less than a reference memory size of references; and
the first set of elements of the first data structure should be inlined into the first data structure if the total memory size is equal to or less than the reference memory size, and the first set of elements of the first data structure should not be inlined into the first data structure if the total memory size is not equal to or less than the reference memory size.

14. The one or more media of claim 9, wherein:
creating or accessing the first data structure based on the inlined memory structure comprises one of:
   allocating a memory space of the total memory size for storing the first set of elements of the first data structure;
   accessing the first data structure based on the total memory size of the memory space of the second data structure that stores the first set of elements of the first data structure.

15. The one or more media of claim 9, storing the instructions which further cause:
identifying a portion of a memory space allocated to the first data structure that corresponds to an element of the first data structure;
performing one of:
   writing a data value for the element of the first data structure to the portion of the memory space allocated to the first data structure; or
   reading the data value for the element of the first data structure from the portion of the memory space allocated to the first data structure.

16. The one or more media of claim 15, wherein writing the data value to the portion of the memory space allocated to the first data structure is performed as part of initiating the first data structure.

17. The one or more media of claim 9, storing the instructions which further cause:
identifying a second command to perform at least one of: (a) create a second data structure within the first context, or (b) access the second data structure within the first context;
determining that the second data structure is of the aggregate type;
determining that a second set of elements of the second data structure is of a second type, wherein the first elements of the first data structure are of a first type different than the second type;
based on the type restriction restricting the second data structure to the maximum element count, determining a second total memory size for the maximum element count of the second set of elements of the second data structure;
determining whether the second set of elements of the second data structure should be inlined into the second data structure based on the second total memory size;
responsive to determining that the second set of elements of the second data structure should not be inlined into the second data structure: performing at least one of creating or accessing the second data structure based on an indirect-reference memory structure.

18. The one or more media of claim 9, storing the instructions which further cause:
identifying a second command to perform at least one of: (a) create a second data structure within a different context, or (b) access the second data structure within the different context;
determining that the second data structure is of the aggregate type;
wherein the different context is not associated with the type restriction restricting the second data structure to the maximum element count;
performing at least one of creating or accessing the second data structure based on an indirect- reference memory structure.

19. The one or more media of claim 18, storing the instructions which further cause:
identifying a portion of a first memory space allocated to the first data structure that corresponds to an element of the first data structure;
identifying a reference stored within the portion of the first memory space allocated to the first data structure;
identifying a second memory space referenced by the reference;
performing one of:
   writing a data value for the element of the first data structure to the second memory space; or
   reading the data value for the element of the first data structure from the second memory space.

20. The media of claim 18, wherein:
the first data structure comprises a field of a first object and the second data structure comprises the field of a second object; and
a descriptor of the field indicates that the field is of a particular type.

21. The media of claim 18, wherein:
the first data structure comprises one of a method parameter or method return value of a method during a first execution of the method and the second data structure comprises one of the method parameter or method return value of the method during a second execution of the method;
a descriptor of the method indicates that one of the method parameter or method return value of the method is of a particular type.

22. The media of claim 18, wherein:
the first data structure comprises a local variable of a method during a first execution of the method and the second data structure comprises the local variable of the method during a second execution of the method.

23. The media of claim 18, wherein:
a first set of one or more operands of the first command indicates the first context; and
no operand of the second command indicates the first context.

24. The media of claim 18, wherein:
no operand of the second command indicates the different context; and
the different context comprises a default context.

25. One or more non-transitory computer readable storage media storing instructions which, when executed by one or more hardware processors, cause:
identifying, by a runtime environment, a first command to access a first element, corresponding to a first index, of a first data structure within a first context;
determining, by the runtime environment, that the first data structure is of an aggregate type;
determining, by the runtime environment, that the first context is associated with a type restriction restricting the first data structure to a maximum element count;
wherein an element count greater than the maximum element count is valid for the aggregate type;
based on the maximum element count indicated by the type restriction: determining, by the runtime environment, whether the first index into the first data structure is out of bounds;
responsive to determining that the first index into the first data structure is out of bounds:
generating, by the runtime environment, an error.

26. The one or more media of claim 25, wherein a memory space allocated to the first data structure is located within one of: an operand stack, a local variable structure, or a heap.

27. The one or more media of claim 25, wherein no memory space allocated to the first data structure stores an actual element count of the first data structure.

28. The one or more media of claim 25, storing the instructions which further cause:
identifying a second command to access a second element, corresponding to a second index, of a second data structure within a different context;
determining that the second data structure is of the aggregate type;
wherein the different context is not associated with the type restriction restricting the second data structure to the maximum element count;
wherein a memory space allocated to the second data structure stores an actual element count of the second data structure,
accessing the memory space allocated to the second data structure to obtain the actual element count of the second data structure;
based on the actual element count, determining whether the second index into the second data structure is out of bounds.

29. The media of claim 28, wherein:
the first data structure comprises a field of a first object and the second data structure comprises the field of a second object; and
a descriptor of the field indicates that the field is of a particular type.

30. The media of claim 28, wherein:
the first data structure comprises one of a method parameter or method return value of a method during a first execution of the method and the second data structure comprises one of the method parameter or method return value of the method during a second execution of the method;
a descriptor of the method indicates that one of the method parameter or method return value of the method is of a particular type.

* * * * *

UNITED STATES PATENT AND TRADEMARK OFFICE
CERTIFICATE OF CORRECTION

| | |
|---|---|
| PATENT NO. | : 11,836,552 B2 |
| APPLICATION NO. | : 17/571379 |
| DATED | : December 5, 2023 |
| INVENTOR(S) | : Rose et al. |

It is certified that error appears in the above-identified patent and that said Letters Patent is hereby corrected as shown below:

In the Specification

In Column 1, Line 42, delete "values,each" and insert -- values"; each --, therefor.

In Column 23, Lines 62-63, delete "Ob j e ct." and insert -- Object. --, therefor.

In Column 27, Line 24, delete "field" and insert -- field. --, therefor.

In the Claims

In Column 42, Line 23, in Claim 28, delete "structure," and insert -- structure; --, therefor.

Signed and Sealed this
Eleventh Day of June, 2024

Katherine Kelly Vidal
*Director of the United States Patent and Trademark Office*